(12) United States Patent
Takizawa

(10) Patent No.: US 11,216,402 B2
(45) Date of Patent: Jan. 4, 2022

(54) STORAGE SYSTEM AND CONTROL METHOD THEREOF

(71) Applicant: CANON KABUSHIKI KAISHA, Tokyo (JP)

(72) Inventor: Masahiro Takizawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 278 days.

(21) Appl. No.: 16/401,656

(22) Filed: May 2, 2019

(65) Prior Publication Data
US 2019/0354501 A1 Nov. 21, 2019

(30) Foreign Application Priority Data
May 18, 2018 (JP) .............................. JP2018-096344

(51) Int. Cl.
*G06F 13/40* (2006.01)
*G06F 13/16* (2006.01)
*G06F 21/60* (2013.01)
*G06F 3/06* (2006.01)

(52) U.S. Cl.
CPC ........ *G06F 13/4027* (2013.01); *G06F 3/0604* (2013.01); *G06F 3/0659* (2013.01); *G06F 3/0683* (2013.01); *G06F 13/1668* (2013.01); *G06F 21/602* (2013.01)

(58) Field of Classification Search
CPC ............. G06F 13/4027; G06F 13/1668; G06F 3/0604; G06F 3/0659; G06F 3/0683; G06F 21/602
See application file for complete search history.

(56) References Cited

U.S. PATENT DOCUMENTS

| | | | | |
|---|---|---|---|---|
| 7,051,147 B2* | 5/2006 | Hoese | ................. | G06F 13/1668 710/305 |
| 7,526,592 B2* | 4/2009 | Tsuruta | ................... | G06F 13/24 710/262 |
| 7,835,373 B2* | 11/2010 | Cardona | ............. | H04L 12/4625 370/401 |
| 8,839,359 B2 | 9/2014 | Ito et al. | | |
| 10,498,783 B2* | 12/2019 | Turrie | ................. | H04L 65/4076 |
| 2003/0051110 A1* | 3/2003 | Gaspard | ............. | G11B 20/1803 711/162 |

(Continued)

FOREIGN PATENT DOCUMENTS

JP 4829639 B2 12/2011

*Primary Examiner* — Vance M Little
(74) *Attorney, Agent, or Firm* — Carter, DeLuca & Farrell LLP

(57) ABSTRACT

The storage comprises a first bridge, a second bridge that can be connected to the first bridge, a first storage device that can be connected to the first bridge, and second and third storage devices that can be connected to the second bridge. If a command that has been received from a main controller is a command not corresponding to the first storage device and an access destination of the main controller is the second bridge, a controller transmits a command corresponding to the received command to the second bridge. In contrast, if the command that has been received from the main controller is a command corresponding to the first storage device, the controller transmits the command corresponding to the received command to the second bridge or the first storage device.

16 Claims, 15 Drawing Sheets

(56) References Cited

U.S. PATENT DOCUMENTS

| | | | |
|---|---|---|---|
| 2003/0126332 A1* | 7/2003 | Toguchi | G06F 13/4027 |
| | | | 710/118 |
| 2004/0153723 A1* | 8/2004 | Depew | G06F 11/1666 |
| | | | 714/6.11 |
| 2005/0273649 A1* | 12/2005 | Jung | G06F 13/124 |
| | | | 714/5.11 |
| 2006/0114918 A1* | 6/2006 | Ikeda | H04L 45/02 |
| | | | 370/408 |
| 2007/0028082 A1* | 2/2007 | Lien | G06F 9/441 |
| | | | 713/1 |
| 2007/0073916 A1* | 3/2007 | Rothman | G06F 21/62 |
| | | | 710/14 |
| 2007/0168594 A1* | 7/2007 | Mitsubayashi | G06F 13/4027 |
| | | | 710/311 |
| 2012/0159265 A1* | 6/2012 | Nishita | G06F 11/10 |
| | | | 714/49 |
| 2013/0254487 A1* | 9/2013 | Tanaka | G06F 12/0808 |
| | | | 711/123 |
| 2015/0356034 A1* | 12/2015 | Pamley | G06F 13/4027 |
| | | | 710/308 |

* cited by examiner

FIG. 9

| COMMAND NAME | TYPE |
|---|---|
| GET STATUS | Non-Data |
| INSTALL | PIO data-out |
| VERSION INFORMATION | PIO data-in |
| CHANGE NORMAL | Non-Data |
| CHANGE INTERCEPT | Non-Data |
| ⋮ | ⋮ |
| SELECT PORT | PIO data-out |
| TO CASCADE | PIO data-out |

FIG. 10

| COMMAND NAME | TYPE |
|---|---|
| RECALIBRATE | Non-Data |
| SEEK | Non-Data |
| EXECUTIVE DEVICE DIAGNOSTIC | Non-Data |
| . . . | . . . |
| READ DMA | DMA data-in |
| WRITE DMA | DMA data-out |
| . . . | . . . |
| FLUSH CACHE | Non-Data |
| IDENTIFY DEVICE | PIO data-in |
| SET FEATURES | Non-Data |

FIG. 14

| 1301 OPERATION STATE DURING RECEIPT OF COMMAND | 1302 INSIDE BRIDGE | | 1303 CONNECTION DESTINATION OF SATA HOST | | | | | |
|---|---|---|---|---|---|---|---|---|
| | | | HDD | | SSD | | BRIDGE | |
| | ATA COMMAND LIST 1 | EXTENDED COMMAND LIST 1 | ATA COMMAND LIST 2 | EXTENDED COMMAND LIST 2 | ATA COMMAND LIST 3 | EXTENDED COMMAND LIST 3 | ATA COMMAND LIST 4 | EXTENDED COMMAND LIST 4 |
| CUTOFF STATE | | | | | | | | |
| NORMAL STATE | ATA COMMAND LIST 5 | EXTENDED COMMAND LIST 5 | ATA COMMAND LIST 6 | EXTENDED COMMAND LIST 6 | ATA COMMAND LIST 7 | EXTENDED COMMAND LIST 7 | ATA COMMAND LIST 8 | EXTENDED COMMAND LIST 8 |
| BYPASS STATE | ATA COMMAND LIST 9 | EXTENDED COMMAND LIST 9 | ATA COMMAND LIST 10 | EXTENDED COMMAND LIST 10 | ATA COMMAND LIST 11 | EXTENDED COMMAND LIST 11 | ATA COMMAND LIST 12 | EXTENDED COMMAND LIST 12 |
| DATA TRANSFER STATE | ATA COMMAND LIST 13 | EXTENDED COMMAND LIST 13 | ATA COMMAND LIST 14 | EXTENDED COMMAND LIST 14 | ATA COMMAND LIST 15 | EXTENDED COMMAND LIST 15 | ATA COMMAND LIST 16 | EXTENDED COMMAND LIST 16 |

STORAGE SYSTEM AND CONTROL METHOD THEREOF

BACKGROUND OF THE INVENTION

Field of the Invention

The present invention relates to a storage system, and a control method thereof.

Description of the Related Art

An information processing apparatus such as an MFP (Multi-Function Printer) includes a storage device such as an HDD (Hard Disk Drive) for storing a program of the apparatus and image data of a user. Additionally, conventionally, a method for controlling a command such as ATA (Advanced Technology Attachment) that is an interface (I/F) standard of the storage device has been proposed. For example, Japanese Patent No. 4829639 discloses a technique that uses an expanded command defined by using a vendor-unique command to serve as a command for accessing a reserved region via an I/F in conformity to the ATA 8-ACS standard, in security authentication between a main controller and a SATA (Serial ATA) bridge. In this technique, the SATA bridge issues an access command for accessing to the storage device after the authentication is completed while not issuing an access command for accessing to the storage device before the authentication starts.

The SATA bridge disclosed in Japanese Patent No. 4829639 does not issue an extended command via the SATA I/F, regardless of whether or not be authenticated. Accordingly, the SATA bridge has the inconvenience that it can be connected only to the storage devices such as SSD and HDD.

In contrast, devices other than the storage devices, for example a SATA device of the subsequent stage can also be connected to the SATA bridge by allowing the transmission of the extended command in which the SATA bridge is made a host. In this case, it is also considered to be possible to connect an SSD device that realizes a high-speed access operation to the SATA bridge of the preceding stage, connect a plurality of HDD devices to the SATA bridge of the subsequent stage, and realize a mirroring function by using the HDD devices. However, since the bridge of the preceding stage does not have a function for determining the type of the device of the subsequent stage that is connected to the bridge of the preceding stage, the device of the preceding stage cannot appropriately transmit the commands to the device of the subsequent stage appropriately based on the types of commands (standard command or extended command). Therefore, an erroneous operation of the device of the subsequent stage may occur due to the transmission of an erroneous command.

SUMMARY OF THE DISCLOSURE

The present invention provides a technique that enables a bridge to connect to a device other than a storage device and achieve both a mirroring function and a high access speed by making it possible to transmit a command appropriately for the type of the receiving device of the subsequent stage.

A storage system according to one embodiment of the present invention is a storage system connected with a plurality of storage devices, which comprises, a first bridge configured to communicate with a main controller; a second bridge configured to enable communication with the first bridge; a first storage device configured to enable communication with the first bridge; and a second storage device and a third storage device configured to enable communication with the second bridge, wherein the first bridge has a controller, the controller transmits a command corresponding to a received command to the second bridge, based on that a command that has been received from the main controller is a command not corresponding to the first storage device and an access destination of the main controller is the second bridge, and the controller transmits a command corresponding to the received command to the second bridge or the first storage device, based on a command that has been received from the main controller is a command corresponding to the first storage device.

According to the present invention, it is possible to connect a bridge to a device other than a storage device and achieve both a mirroring function and a high access speed by transmitting a command appropriately for the type of the receiving device of the subsequent stage.

Further features of the present invention will become apparent from the following description of exemplary embodiments with reference to the attached drawings.

BRIEF DESCRIPTION OF THE DRAWINGS

FIG. 9 illustrates an example of an extended command.

FIG. 10 illustrates an example of a standard command.

FIG. 14 illustrates an example of a command list.

DESCRIPTION OF THE EMBODIMENTS

Figure 1:
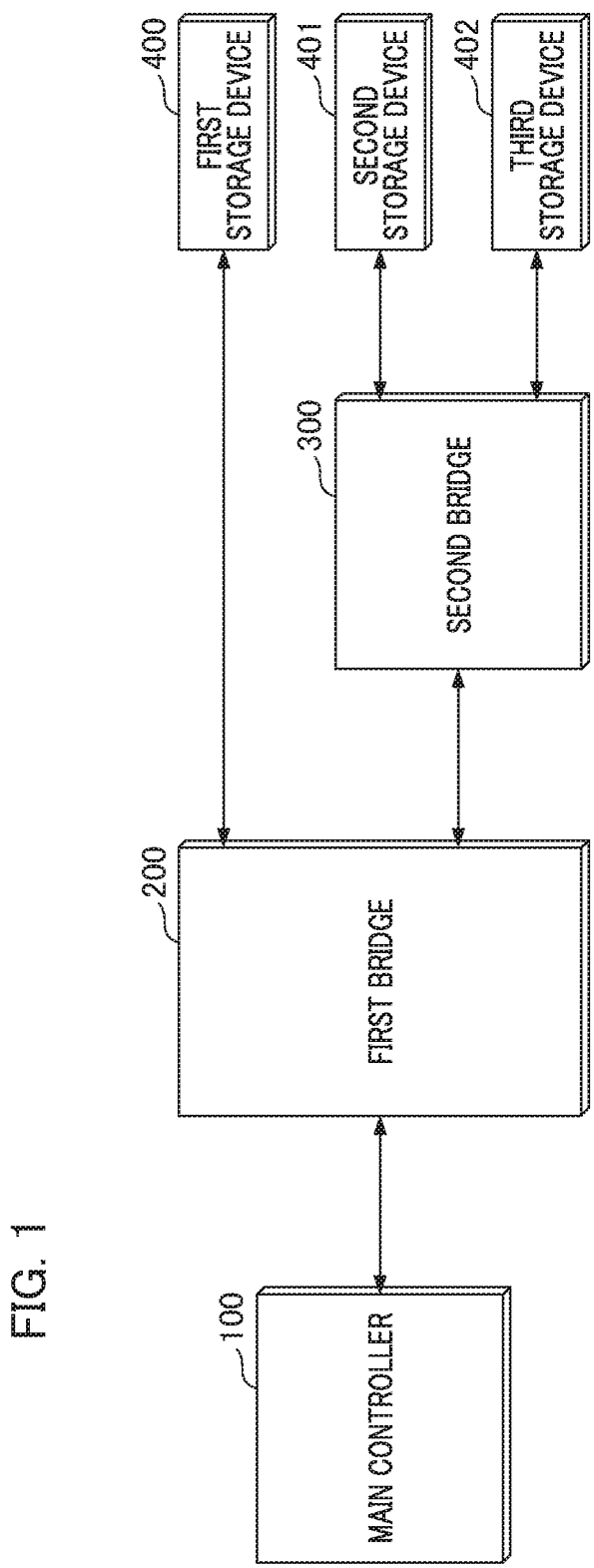
FIG. 1 is a configuration diagram of a storage system according to one embodiment of the present invention.

In each embodiment below, a technique that allows a device other than storage devices such as a bridge of the subsequent stage to connect to a bridge of the preceding stage by enabling transmission of an extended command from the bridge of the preceding stage will be described. For example, if a storage device is connected to the bridge of the preceding stage, the extended command is masked, in other words, the extended command is not transmitted. In contrast, if the bridge of the subsequent stage is connected to the bridge of the preceding stage, the extended command is transmitted to the bridge of the subsequent stage. Accordingly, both of the storage device and other devices can be connected to the bridge.

Meanwhile, among information processing apparatuses such as MFP, there is a model having a mirroring function that can strongly protect data by attaching a plurality of storage devices and writing the identical data to each storage device. It can be said that the mirroring function is a promising technique because it has a feature in which the data can be recovered from a remaining storage device even if one of the storage devices fails and reading/writing becomes impossible, hence the risk of losing data can be avoided.

In contrast, in recent years, an SSD (Solid State Drive) device has appeared as a storage device, and the device can perform a high-speed reading/writing process, so that it is beginning to be used as a storage device of information processing apparatus such as MFP. Accordingly, although realizing the above-mentioned mirroring function by using a plurality of SSD devices is considered, the cost of the SSD device alone is higher than that of the HDD device alone, and as a result, realizing the mirroring function by using only the SSD device is practically difficult due to the cost.

The means described above solves such a problem. Specifically, the first and second bridges are cascade-connected, and a first storage device (for example, an SSD device), which realizes a high access speed, is connected to a first bridge that is a preceding stage. Additionally, second and third storage devices (for example, HDD devices) that realize a mirroring function are connected to the second bridge that is a subsequent stage. In this case, a standard command for accessing the first storage device is transmitted to the first storage device and the second bridge is masked with respect to the standard command. Additionally, the extended command related to mirroring is changed to a format that can be executed by the second bridge, then transmitted to the second bridge, and the first storage device is masked with respect to the extended command.

In this way, a command that can be transmitted to the device is changed in accordance with the type of the device of the subsequent stage connected to the first bridge, and as a result, an information processing apparatus that achieves both of a mirroring function and a high access speed is realized. The storage system described below is connected with a storage device having a large capacity, for example, an HDD device, and storage devices respectively having a small capacity and high speed, for example, SSD devices, and the storage system is suitable for controlling a mirroring function and an encryption/decryption function by using, for example, an ATA command and a vendor unique command.

Hereinafter, embodiments of the present invention will be specifically described.

First Embodiment

FIG. 1 illustrates a configuration diagram of a storage system according to the first embodiment.

Although the storage system according to the present embodiment is applied to MFP serving as an information processing apparatus, the present invention is not limited thereto. F or example, the present invention is applicable to an information processing apparatus including a plurality of storage devices.

The storage system according to the present embodiment includes a main controller 100, first to third storage devices 400, 401, and 402, and first and second bridges 200 and 300. The main controller 100 controls the entire MFP. The first to third storage devices 400, 401, and 402 store data. The first and second bridges 200 and 300 transmit and receive data to and from the first to third storage devices 400, 401, and 402.

Although the storage system according to the present embodiment uses an SSD device as the first storage device 400 and HDD devices as the second and third storage devices 401 and 402, the present invention is not limited thereto. It suffices if the first storage device 400 is a storage device that can store data at an access speed higher than the second and third storage devices 401 and 402. Additionally, it suffices if the second and third storage devices 401 and 402 are storage devices having an access speed lower than the first storage device 400 but having a storage capacity larger than the first storage device 400. The second and third storage devices 401 and 402 respectively stores a boot program, user data and so on. Since such data requires reliability, it is stored by using the mirroring function.

The main controller 100, the first bridge 200, and the second bridge 300 are connected in series. The first bridge 200 includes a plurality of connection ports. The first storage device 400 can be connected to one of the connection ports of the first bridge 200 and the second bridge 300 can be connected to another one. Similarly, the second bridge 300 also includes a plurality of connection ports. The second storage device 401 can be connected to one of the connection ports of the second bridge 300 and the third storage device 402 can be connected to another one. In the present embodiment, although the number of bridges is two, the present invention is not limited thereto. Other bridge may further be connected to the first and second bridges 200 and 300.

Additionally, the first and second bridges 200 and 300 are recognized as one bridge as viewed from the main controller 100.

Figure 2:
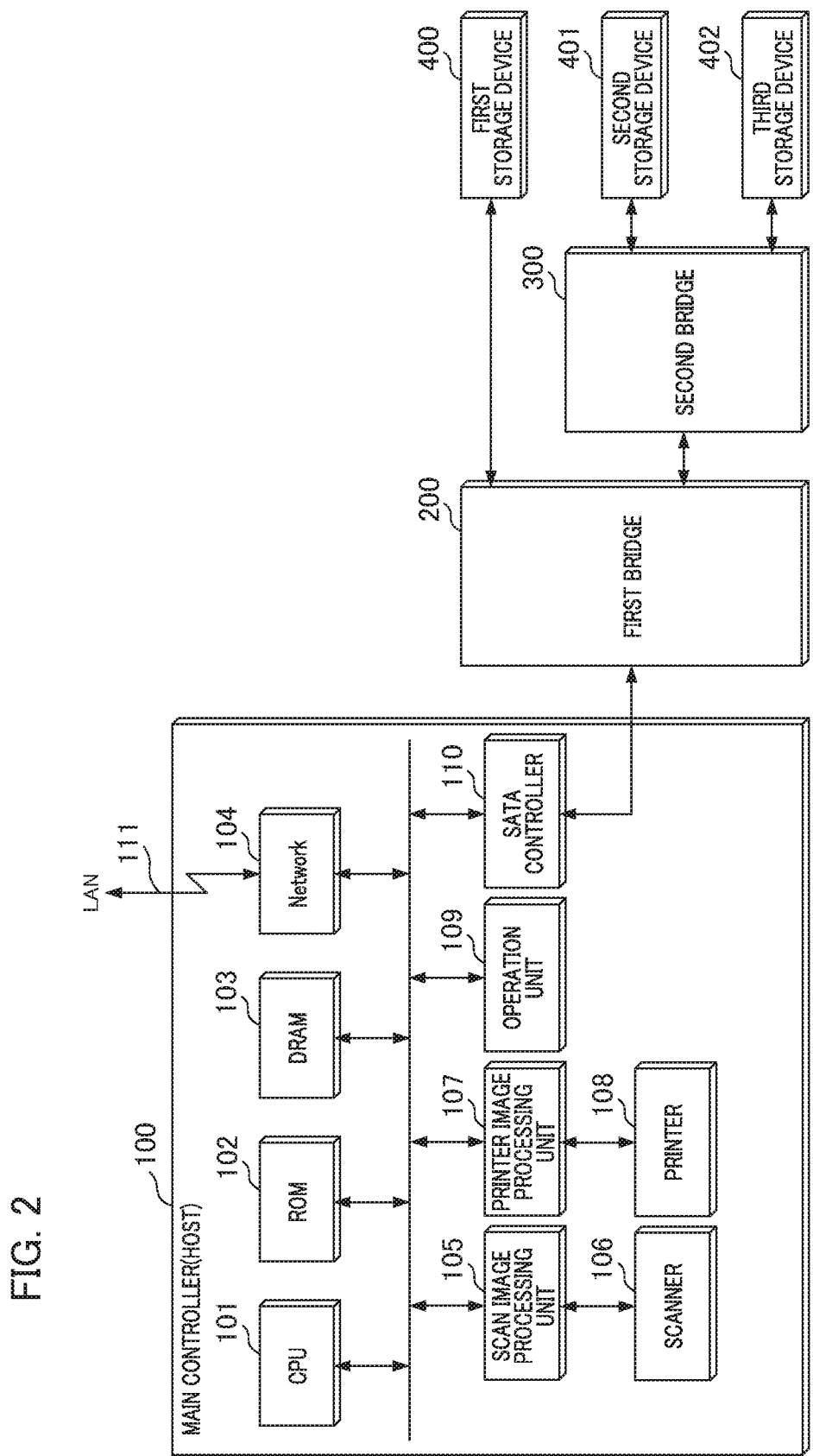
FIG. 2 is a detailed configuration diagram of a main controller.

FIG. 2 illustrates a detailed configuration diagram of the main controller.

The main controller (host) 100 includes a CPU (Central Processing Unit) 101, a ROM (Read Only Memory) 102, a DRAM (Dynamic Random Access Memory) 103, and a network 104. Further, the main controller 100 includes a scan image processing unit 105, a scanner 106, a printer image processing unit 107, a printer 108, an operation unit 109, and a SATA controller 110.

The CPU 101 is a controller that controls the entire storage system, and executes, system control, calculation processing, an OS (Operating System), an application and so on.

The ROM 102 is a read-only memory and stores a program to be executed by the CPU 101 and setting information.

The DRAM 103 stores a control program to be executed by the CPU 101. The DRAM 103 is also used as a temporary working area.

The network 104 is a network I/F. The image data is applied image processing in the storage system and then transmitted to the outside, that is an information device (not illustrated), by the network 104. Moreover, the network 104 receives the image data from the outside.

The scan image processing unit 105 applies image processing to the image data that has been received from the scanner 106. After being processed by the scan image processing unit 105, the image data is transmitted to the first and second bridges 200 and 300 via the SATA controller 110 and is stored in the first to third storage devices 400 to 402.

The scanner 106 is an image input device, and, for example, irradiates a light to an image on paper as a document, scans a CC D line sensor, detects a reflected light, and acquires an electric signal as raster image data.

The printer image processing unit 107 applies image processing to the image data that has been received from the outside or from the first to third storage devices 400 to 402. The image data processed by the printer image processing unit 107 is transmitted to the printer 108. The printer 108 is an image output device which converts the raster image data into an image to be printed on paper.

The operation unit 109 is a device such as a touch panel having both a display function and an operation function. The operation unit 109 has the role of displaying input image data and the role of providing a notification of information input by the user to the CPU 101.

The SATA controller 110 controls connected devices by a procedure in conformity to the SATA (Serial ATA) standard and thereby transmits and received data to and from the first bridge 200. A LAN 111 is a network for communicating between an information processing apparatus including the main controller 100 and the outside (information device).

Figure 3:
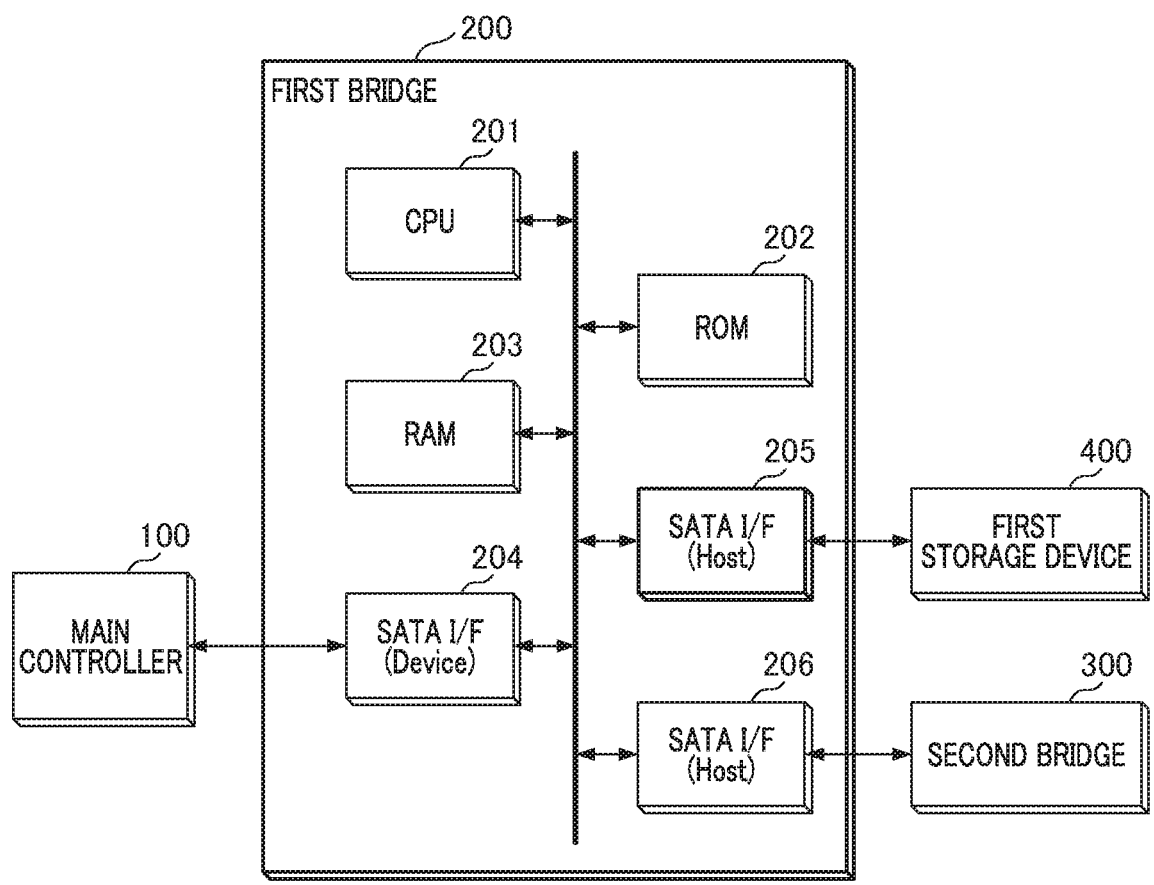
FIG. 3 is a detailed configuration diagram of a first bridge.

FIG. 3 illustrates a detailed configuration diagram of the first bridge 200.

The CPU 201 performs, system control, calculation processing, ATA command processing etc. of the first bridge 200. Additionally, the CPU 201 performs processing of input commands received from the main controller 100 and to be transmitted to the second bridge 300 or the first storage device 400.

The CPU 201 constructs a device determination unit and a command processing unit (neither is illustrated) by software. The device determination unit executes a process that determines the type of the device connected to the first bridge 200 and the command processing unit executes a process that changes the input command processing based on the type of the device.

If the input command is an extended command related to setting or inquiry to the second bridge 300, the command processing unit transmits the extended command to the second bridge 300 and transmits a response to the extended command to the main controller 100.

In addition, if the input command is a standard command for accessing the first storage device 400, the command processing unit transmits the standard command to the first storage device 400. Additionally, if the input command is an extended command related to encryption or decryption, the command processing unit processes the extended command in the first bridge 200 and does not transmit the extended command to the second bridge 300. In contrast, if the input command is an extended command related to mirroring, the command processing unit transmits the extended command to the second bridge 300.

Furthermore, if the main controller 100 recognizes the first and second bridges 200 and 300 as one bridge, the command processing unit performs the processing below.

For example, if the input command is an extended command related to setting or an inquiry to the one bridge, the command processing unit processes the extended command in the first bridge 200, and transmits the extended command to the second bridge 300.

Additionally, the command processing unit merges the responses from the first and second bridges, and transmits the merged response to the main controller 100.

The ROM 202 stores a control program of the CPU 201, data related to setting values of various modes and so on.

The RAM 203 stores a control program to be executed by the CPU 201. The RAM 203 is also used as a temporary working area.

A SATA I/F 204 includes a connection port connected to the main controller 100, and performs communication with the SATA controller 110 (FIG. 2) in the main controller 100 in conformity to the SATA standard. In this case, the main controller 100 functions as a host, and the SATA I/F 204 functions as a device controlled by the host.

A SATA I/F 205 includes a connection port connected to the first storage device 400, and a SATA I/F 206 includes a connection port connected to the second bridge 300. The SATA I/Fs 205 and 206 communicate with the first storage device 400 or the second bridge 300 in conformity to the SATA standard. In this case, the SATA I/Fs 205 and 206 function as hosts, and the first storage device 400 and the second bridge 300 function as devices controlled by the host.

Figure 4:
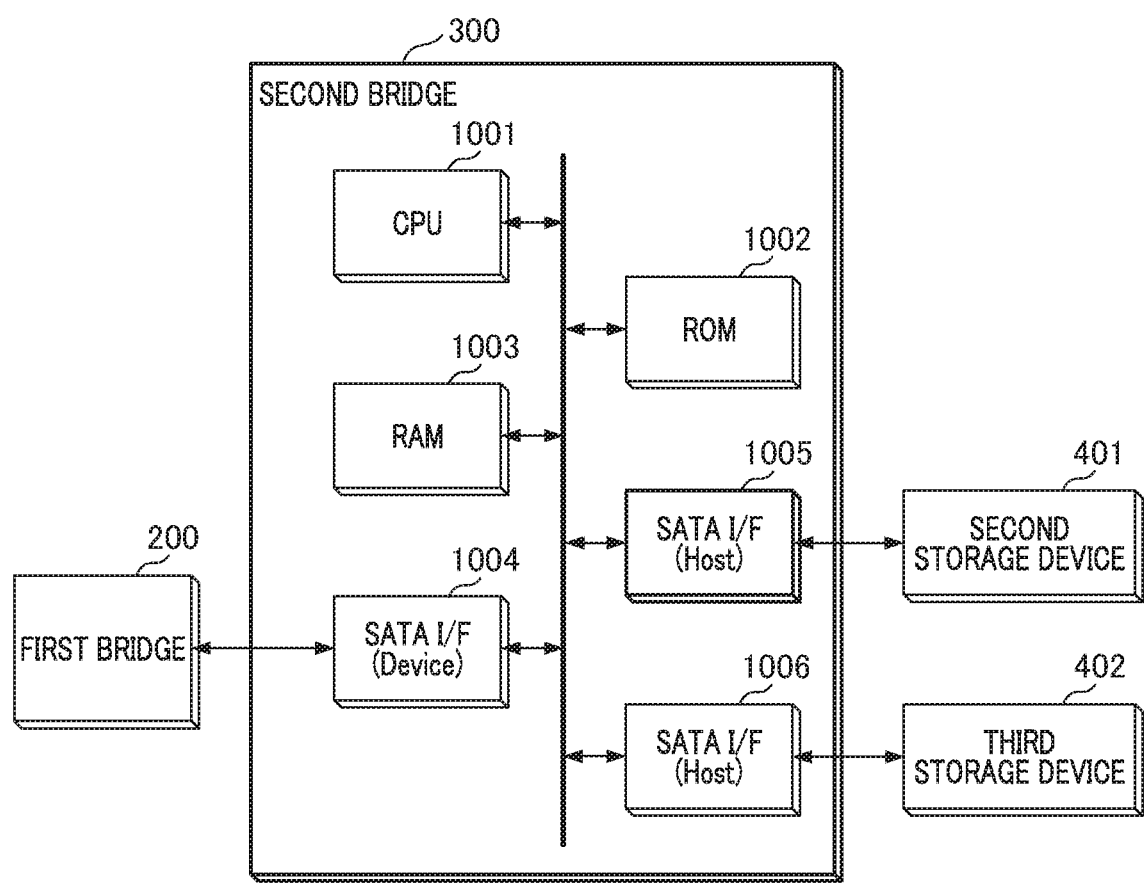
FIG. 4 is a detailed configuration diagram of a second bridge.

FIG. 4 illustrates a detailed configuration diagram of the second bridge 300.

A CPU 1001 performs system control, calculation processing, ATA command processing etc. of the second bridge 300. Additionally, the CPU 1001 performs the processing of input commands received from the first bridge 200 and to be transmitted to the second storage device 401 or the third storage device 402.

The CPU 1001 constructs a device determination unit and a command processing unit (neither is illustrated) by software. The device determination unit executes the processing that determines the type of the device connected to the second bridge 300 and the command processing unit executes the processing that changes the process of the input command based on the type of the device.

If the input command is a standard command for accessing the second or third storage device 401 or 402, the command processing unit transmits the standard command to the second or third storage device 401 or 402.

Additionally, if the input command is an extended command related to mirroring, the command processing unit processes the extended command in the second bridge 300.

A ROM 1002 stores a control program, data related to setting values of various modes etc. of the CPU 1001.

The RAM 1003 stores a control program to be executed by the CPU 1001.

The RAM 1003 is also used as a temporary working area.

A SATA I/F 1004 is provided with a connection port connected to the first bridge 200 and thereby communicates with the SATA I/F 206 (FIG. 3) in the first bridge 200 in conformity to the SATA standard. In this case, the SATA I/F 206 functions as a host, and the SATA I/F 1004 functions as a device controlled by the host.

A SATA I/F 1005 is provided with a connection port connected to the second storage device 401, and the SATA I/F 1006 is provided with a connection port connected to the third storage device 402. The SATA I/Fs 1005 and 1006 communicate with the second storage device 401 or the third storage device 402 in conformity to the SATA standard. In this case, the SATA I/Fs 1005 and 1006 function as hosts, and the second storage device 401 and the third storage device 402 function as devices controlled by the hosts.

Note that, in the examples in FIGS. 3 and 4, although the first and second bridges 200 and 300 include the same elements, the present invention is not limited thereto. Specifically, either the first and second bridge 200 or 300 may have an element or a function that is not included in the other.

Additionally, the SATA controller 110, the first bridge 200, and the second bridge 300 in FIG. 2 may be formed in different chips or may be formed in an identical chip. Additionally, the SATA controller 110 and the first bridge 200 may be formed in an identical chip, or the first bridge 200 and the second bridge 300 may be formed in an identical chip.

Next, the operation of the first and second bridges 200 and 300 will be described with reference to the flowcharts in FIG. 5 to FIG. 7.

Figure 5:
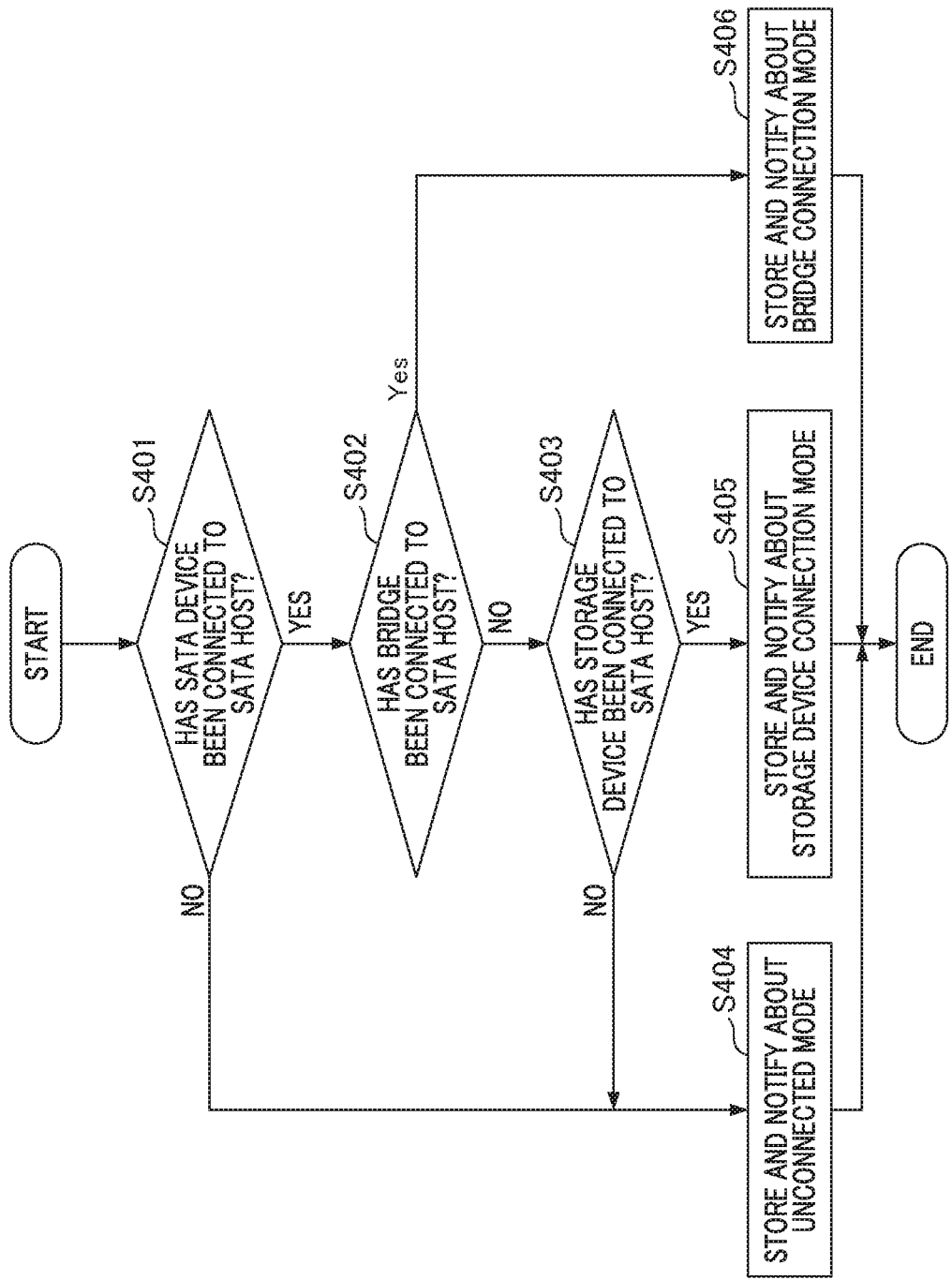
FIG. 5 is a flowchart illustrating an operation of a device determination unit.
Figure 6:
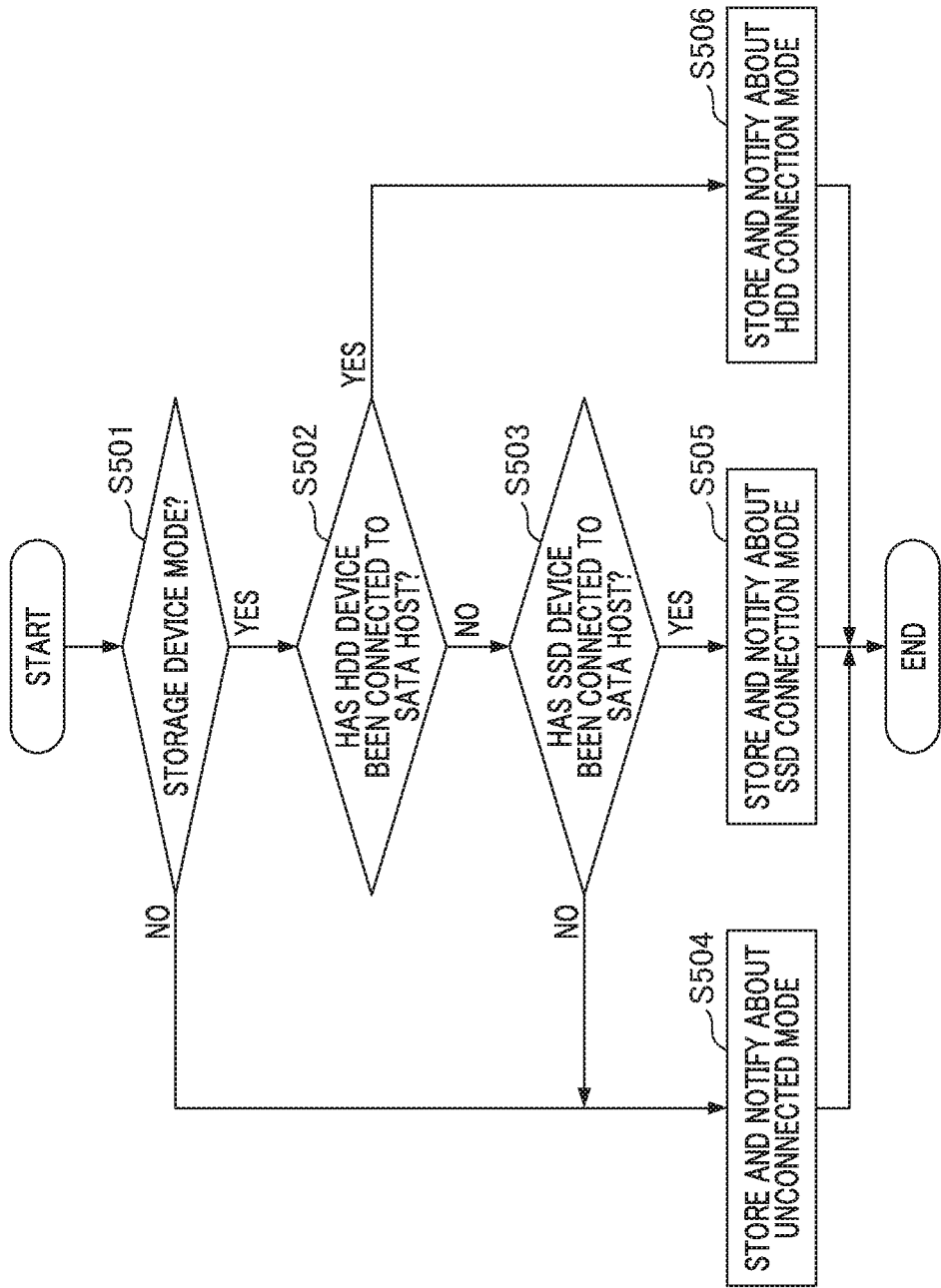
FIG. 6 is a flowchart illustrating an operation of the device determination unit.

FIGS. 5 and 6 illustrate the operation of the device determination unit that the CPUs 201 or 1001 construct using software.

The flowcharts in FIGS. 5 and 6 are realized by the execution of a program by the CPUs 201 and 1001. The program is stored in any one of the RAMs 203 and 1003, the ROMs 202 and 1002, and the first to third storage devices 400 to 402.

Additionally, the flowcharts in FIG. 5 and FIG. 6 are executed for each SATA I/F. Specifically, according to the present embodiment, as shown in FIG. 3, since the first bridge 200 includes two SATA I/Fs 205 and 206, the flowcharts in FIG. 5 and FIG. 6 are executed once for each of the SATA I/Fs 205 and 206, twice in total. Which one of the SATA I/Fs 205 or 206 is to be the first target for the flowchart is not limited, in particular.

For example, after the processing of the flowcharts in FIG. 5 and FIG. 6 are executed for the SATA I/F 205, the flowcharts may be executed for the SATA I/F 206, or vice versa. Additionally, the flowcharts in FIG. 5 and FIG. 6 may be executed in parallel for the two SATA I/Fs 205 and 206.

Similarly, in the present embodiment, as shown in FIG. 4, the second bridge 300 includes two SATA I/Fs 1005 and 1006, so the flowcharts in FIG. 5 and FIG. 6 are executed once for each of the SATA I/Fs 1005 and 1006, or twice in total. Which one of the SATA I/F s 1005 or 1006 is to be the first target of the processing of the flowcharts in FIG. 5 and FIG. 6 is not limited in particular.

Additionally, it is desirable that the flowcharts in FIG. 5 and FIG. 6 are executed during initialization of the first and second bridges 200 and 300, for example, upon startup of the storage system according to the present embodiment. However, the execution timing of the flowcharts in FIG. 5 and FIG. 6 are not limited thereto, and they may be executed, for example, upon access to the SATA device by the main controller 100.

(The Operation of the First Bridge 200)

In the processes from steps S401 to S403, the device determination unit of the CPU 201 determines whether or not the SATA device is connected to the first bridge 200, and moreover, in the case where the SATA device is connected to the first bridge 200, the device determination unit of the CPU 201 determines the type of the SATA device.

First, in step S401, the device determination unit determines whether or not the SATA device is connected to the SATA host. In this context, the SATA host corresponds to the SATA I/Fs 205 and 206 in FIG. 3, and the SATA device corresponds to the first storage device 400 and the second bridge 300 in FIG. 3.

For example, the device determination unit issues an ATA command such as IDENTIFY DEVICE, and if there is no response from the SATA I/Fs 205 and 206, it determines that the SATA device is not connected to them, and the process proceeds to step S404. In contrast, the device determination unit issues the ATA command such as IDENTIFY DEVICE, and if there is a response from the SATA I/Fs 205 and 206, it determines that the SATA device is connected to them, and the process proceeds to step S402.

However, the determination as to whether or not the SATA device is connected to the SATA host is not limited to the determination by issuance of the ATA command such as IDENTIFY DEVICE. Any method may be used for the determination if the method can confirm the presence or absence of the connection of the SATA device. Of course, the command used in this determination is not limited to the ATA command, and an extended command may be issued.

Note that step S401 is not an indispensable process and may be omitted.

Next, in step S402, the device determination unit determines whether or not a bridge is connected to the SATA host. For example, the device determination unit issues an ATA command or an extended command, and if there is no response from the SATA I/Fs 205 and 206, it determines that the bridge is not connected to them, and the process proceeds to step S403. In contrast, the device determination unit issues the ATA command or the extended command, and if there is a response from the SATA I/Fs 205 and 206, the device determination unit determines that the bridge is connected to them, and the process proceeds to step S406.

Next, in step S403, the device determination unit determines whether or not the storage device is connected to the SATA host. For example, the device determination unit issues an ATA command, and if there is no response from the SATA I/Fs 205 and 206, it is determined that the storage device is not connected to them, in other words, an unknown SATA device is connected, and the process proceeds to step S404. In contrast, the device determination unit issues the ATA command, and if there is a response from the SATA I/Fs 205 and 206, the device determination unit determines that the storage device is connected to them, and the process proceeds to step S405.

As described above, the device determination unit determines the state of each of the SATA I/Fs (connection ports) 205 and 206 from among three states, which are 'the absence of the connection of the SATA device_, 'the presence of the connection of the bridge (second bridge 300)_, and 'the presence of the connection of the storage device (first storage device 400)_. However, 'the absence of the connection of the SATA device includes a case in which an unknown SATA device is connected. Additionally, the device determination unit can manage the SATA I/Fs 205 and 206 according to four states (4 levels) in total, by adding the state that is before the search for the SATA device (before execution of the process shown in the flowchart of FIG. 5) to these three states.

Additionally, if a predetermined connection port among the SATA I/Fs (connection ports) 205 and 206 is in a state before the search for the SATA device, the device determination unit further searches the SATA device connected with the predetermined connection port. Subsequently, the device determination unit determines which state the predetermined connection port belongs among 'the absence of the connection of the SATA device_, 'the presence of the connection of the bridge_, and 'the presence of the connection of the storage device_.

Accordingly, if the SATA device is not connected to the SATA host, or if an unknown SATA device is connected to the SATA host, the CPU 201 can determine that the first bridge 200 is in an unconnected mode. Additionally, the CPU 201 stores, for example, 2-bit data '00indicating that it is in the unconnected mode in the ROM 202 or the RAM 203 (S404) in order to continue to confirm that the first bridge 200 is in the unconnected mode.

Additionally, the CPU 201 provides a notification that the first bridge 200 is in the unconnected mode to the main controller 100. This notification can be performed via the SATA I/F 204, by using, for example, a Register Device to Host (RegDH) in the SATA standard (S404).

In contrast, if the storage device (the first storage device 400) is connected to the SATA host, the CPU 201 can determine that the first bridge 200 is in the storage device connection mode. Additionally, the CPU 201 stores, for example, 2-bit data '01indicating that it is in the storage device connection mode in the ROM 202 or the RAM 203 (S405) in order to continue to confirm that the first bridge 200 is in the storage device connection mode.

Additionally, the CPU 201 provides a notification that the first bridge 200 is in the storage device connection mode to the main controller 100. As described above, this notification can be performed via the SATA I/F 204 by using, for example, RegDH in the SATA standard (S405).

Additionally, if a bridge (second bridge 300) is connected to the SATA host, the CPU 201 can determine that the first bridge 200 is in the bridge connection mode. Additionally, the CPU 201 stores, for example, 2-bit data '10indicating that it is in the bridge connection mode in the ROM 202 or the RAM 203 (S406) in order to continue to confirm that the first bridge 200 is in the bridge connection mode.

Additionally, the CPU 201 provides a notification that the first bridge 200 is in the bridge connection mode to the main controller 100. As described above, this notification can be performed via the SATA I/F 204 by using, for example, the RegDH regulated by the SATA standard (S406).

In the flowchart of FIG. 5, if it is determined that the first bridge 200 is in the storage device connection mode (S403, S405), the process illustrated in the flowchart of FIG. 6 is subsequently executed. The flowchart of FIG. 6 illustrates a process for determining the type (SSD device or HDD device) of the storage device (first storage device 400) connected to the first bridge 200.

However, the execution of the process shown in the flowchart of FIG. 6 may be omitted. That is, if there is no need to specify the type of the storage device connected to the first bridge 200, only the flowchart of FIG. 5 may be executed.

First, in step S501, the device determination unit of the CPU 201 determines whether or not the first bridge 200 is in the storage device connection mode. Specifically, if the device determination unit determines that the storage device (first storage device 400) is connected to the first bridge 200, the process proceeds to step S502. In contrast, if the device determination unit determines that the storage device (first storage device 400) is not connected to the first bridge 200, the process proceeds to step S504.

Next, in step S502, the device determination unit determines whether or not the HDD device is connected to the SATA host. For example, the device determination unit stores the model number of the HDD device that is connectable to the first bridge 200 in the ROM 202 in advance. In addition, the device determination unit compares the model number (Word 27 to 46) obtained by IDENTIFY DEVICE issued in step S401 in FIG. 5 with the model number stored in advance in the ROM 202 to consequently to determine whether or not the first storage device 400 is an HDD device.

As for another example, the device determination unit can determine whether or not the storage device connected to the first bridge 200 is an HDD device, based on a media rotation rate (Word 217) of IDENTIFY DEVICE. For example, if the media rotation rate (Word 217) is other than Non-rotating media (0x0001), the device determination unit can determine that the storage device connected to the first bridge 200 is an HDD device.

However, the determination as to whether or not the storage device connected to the first bridge 200 is an HDD device is not limited thereto, and various methods can be adopted.

In step S502, if the device determination unit determines that the storage device connected to the first bridge 200 is an HDD device, the process proceeds to step S506. In contrast, if the device determination unit determines that the storage device connected to the first bridge 200 is not an HDD device, the process proceeds to step S503.

Next, in step S503, the device determination unit determines whether or not the SSD device is connected to the SATA host. Whether or not the storage device connected to the first bridge 200 is an SSD device may be determined in a manner similar to the determination as to whether or not the storage device connected to the first bridge 200 is an HDD device.

In step S503, if the device determination unit determines that the storage device connected to the first bridge 200 is an SSD device, the process proceeds to step S505. In contrast, if the device determination unit determines that the storage device connected to the first bridge 200 is not an SSD device, in other words, if the storage device connected to the first bridge 200 is an unknown storage device, the process proceeds to step S504.

Through the above processes, the device determination unit can confirm which mode the SATA I/Fs 205 and 206 belong individually among the unconnected mode, the SSD connection mode, and the HDD connection mode.

In the unconnected mode, the CPU 201 stores, for example, 2-bit data '00indicating that the first bridge 200 is in the unconnected mode in the ROM 202 or the RAM 203 in order to continue to confirm that the first bridge 200 is in the unconnected mode. Additionally, the CPU 201 provides a notification that the first bridge 200 is in the unconnected mode to the main controller 100. This notification can be performed via the SATA I/F 204 by using, for example, RegDH in the SATA standard (S504).

In the case of the SSD connection mode, the CPU 201 stores, for example, 2-bit data '11indicating that the first bridge 200 is in the SSD connection mode in the ROM 202 or the RAM 203 in order to continue to confirm that the first bridge 200 is in the SSD connection mode. Additionally, the CPU 201 provides a notification that the first bridge 200 is in the SSD connection mode to the main controller 100. This notification can be performed via the SATA I/F 204 by using, for example, RegDH in the SATA standard (S505).

In the case of the HDD connection mode, the CPU 201 stores, for example, 2-bit data '01indicating that the first bridge 200 is in the HDD connection mode in the ROM 202 or the RAM 203 in order to continue to confirm that the first bridge 200 is in the HDD connection mode. Additionally, the CPU 201 provides a notification that the first bridge 200 is in the HDD connection mode to the main controller 100. This notification can be performed via the SATA I/F 204 by using, for example, RegDH in conforming to the SATA standard (S506).

(The Operation of the Second Bridge 300)

Also in the second bridge 300, similarly to the first bridge 200, the flowcharts in FIG. 5 and FIG. 6 are executed by the device determination unit in the CPU 1001.

First, in steps S401 to S403, the device determination unit determines whether or not the SATA device is connected to the second bridge 300, and if the SATA device is connected to the second bridge 300, the device determination unit determines what the type of the SATA device is.

First, in step S401, the device determination unit determines whether or not the SATA device is connected to the SATA host. If the SATA device is not connected to the SATA host, the process proceeds to step S404. In contrast, if the SATA device is connected to the SATA host, the process proceeds to step S402. Note that step S401 may be omitted in a manner similar to that of the first bridge 200.

Next, in step S402, the device determination unit determines whether or not a bridge is connected to the SATA host. If the bridge is not connected to the SATA host, the process proceeds to step S403. In contrast, if the bridge is connected to the SATA host, the process proceeds to step S406.

Next, in step S403, the device determination unit determines whether or not the storage device is connected to the SATA host. If the storage device is not connected to the SATA host, the process proceeds to step S404. In contrast, if the storage device is connected to the SATA host, the process proceeds to step S405.

Through the above processes, the device determination unit can determine the state of each of the SATA I/Fs 1005 and 1006 from among three states, which are 'the absence of the connection of the SATA device_, 'the presence of the connection of the bridge_, and 'the presence of the connection of the storage devices (the second or third storage devices 401 or 402)_. However, in a manner similar to the case of the first bridge 200, 'the absence of the connection of the SATA device includes a case where an unknown SATA device is connected. Additionally, the device determination unit may manage the SATA I/Fs 1005 and 1006 according to four states in total (four stages) in which the state that is before the search for the SATA device (before execution of the flowcharts in FIG. 5 and FIG. 6) is added to these three states.

The CPU 1001 stores, for example, 2-bit data '00indicating that the second bridge 300 is in the unconnected mode in the ROM 1002 or the RAM 1003 in order to continue to recognize that the second bridge 300 is in the unconnected mode in step S404. Additionally, the CPU 1001 provides a notification that the second bridge 300 is in the unconnected mode to the main controller 100 (S404).

The CPU 1001 stores, for example, 2-bit data '01indicating that the second bridge 300 is in the storage device connection mode in the ROM 1002 or the RAM 1003 in order to continue to confirm that the second bridge 300 is in the storage device connection mode in step S405. Additionally, the CPU 1001 provides a notification that the second bridge 300 is in the storage device connection mode to the main controller 100 (S405).

The CPU 1001 stores, for example, 2-bit data '10indicating that the second bridge 300 is in the bridge connection mode in the ROM 1002 or the RAM 1003 in order to continue to confirm that the second bridge 300 is in the bridge connection mode in step S406. Additionally, the CPU 1001 provides a notification that the second bridge 300 is in the bridge connection mode to the main controller 100 (S406).

In the flowchart of FIG. 5, if it is determined that the second bridge 300 is in the storage device connection mode (S405), in a manner similar to that of the first bridge 200, the flowchart of FIG. 6 may be subsequently executed.

First, in step S501, the device determination unit determines whether or not the second bridge 300 is in the storage device connection mode. Specifically, if the storage devices (second or third storage devices 401 and 402) are connected to the second bridge 300, the process of the device determination unit proceeds to step S502. In contrast, if the storage device is not connected to the second bridge 300, the process of the device determination unit proceeds to step S504.

Next, in step S502, the device determination unit determines whether or not the HDD device is connected to the SATA host. If the device determination unit determines that the storage device connected to the second bridge 300 is the HDD device, the process of the device determination unit proceeds to step S506. In contrast, if the device determination unit determines that the storage device connected to the second bridge 300 is not the HDD device, the process of the device determination unit proceeds to step S503.

Next, in step S503, the device determination unit determines whether or not the SSD device is connected to the SATA host. If the device determination unit determines that the storage device connected to the second bridge 300 is the SSD device, the process of the device determination unit proceeds to step S505. In contrast, if the device determination unit determines that the storage device connected to the second bridge 300 is not the SSD device, in other words, if the storage device connected to the second bridge 300 is an unknown storage device, the process of the device determination unit proceeds to step S504.

Through the above processes, the device determination unit can confirm the unconnected mode, the SSD connection mode, and the HDD connection mode in each of the SATA I/Fs 1005 and 1006.

In the case of the unconnected mode, the CPU 1001 stores, for example, 2-bit data '00indicating that the second bridge 300 is in the unconnected mode in the ROM 1002 or the RAM 1003 in order to continue to grasp that the second bridge 300 is in the unconnected mode. Additionally, the CPU 1001 provides a notification that the second bridge 300 is in the unconnected mode (S504) to the main controller 100.

In the case of the SSD connection mode, the CPU 1001 stores, for example, 2-bit data '11indicating that the second bridge 300 is in the SSD connection mode in the ROM 1002 or the RAM 1003 in order to continue to grasp that the second bridge 300 is in the SSD connection mode. Additionally, the CPU 1001 provides a notification that the second bridge 300 is in the SSD connection mode (S505) to the main controller 100.

In the case of the HDD connection mode, the CPU 1001 stores, for example, 2-bit data '01indicating that the second bridge 300 is in the HDD connection mode in the ROM 1002 or the RAM 1003 in order to continue to grasp that the second bridge 300 is in the HDD connection mode. Additionally, the CPU 1001 provides a notification that the second bridge 300 is in the HDD connection mode (S506) to the main controller 100.

Figure 7:
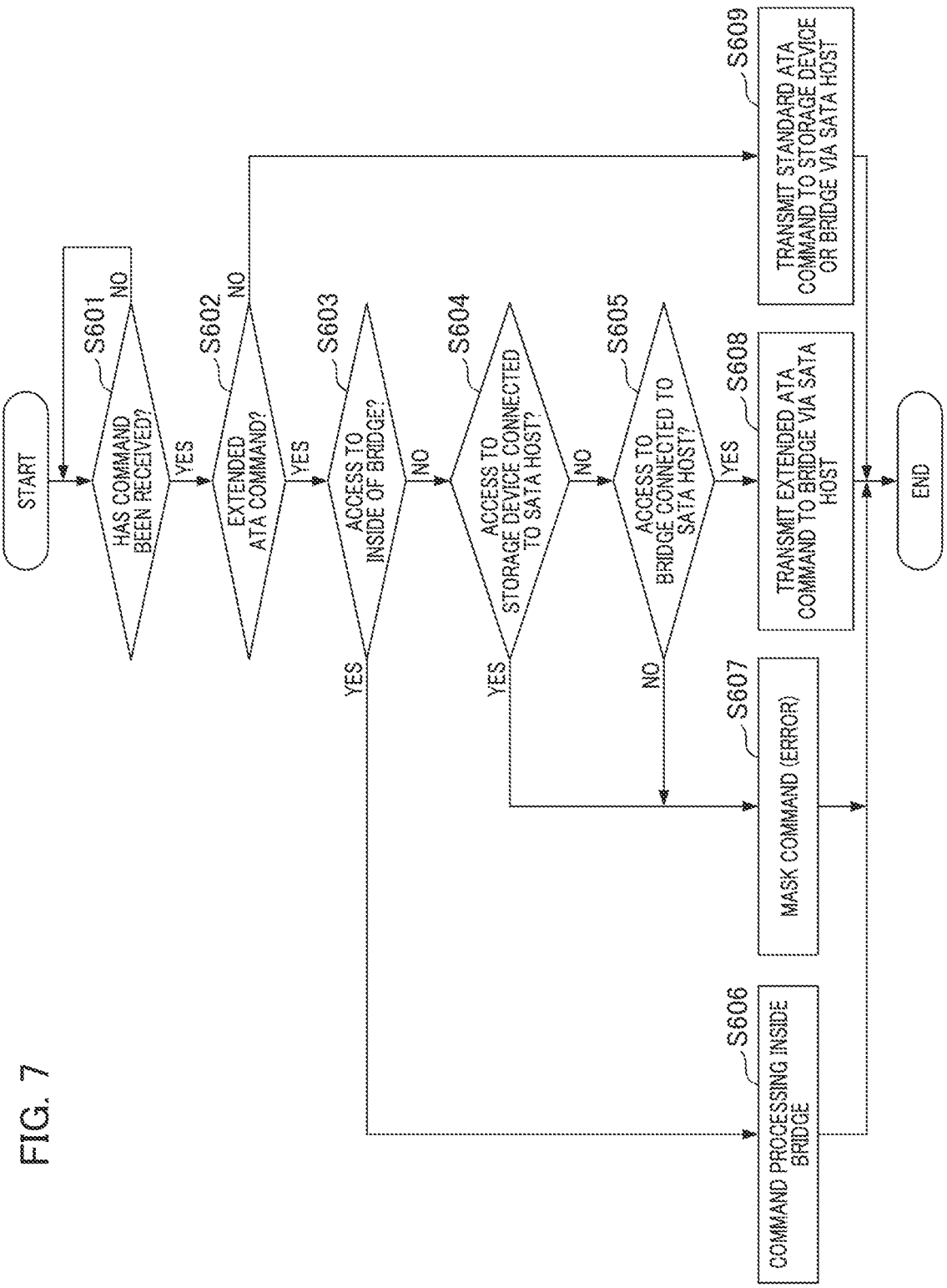
FIG. 7 is a flowchart illustrating an operation of a command processing unit.

FIG. 7 illustrates an operation of the command processing unit in the CPUs 201 and 1001. The flowchart of FIG. 7 is realized by the execution of a program by the CPUs 201 and 1001. The program is stored in any one of the RAMs 203 and 1003, the ROMs 202 and 1002 and the first to third storage devices 400, 401 and 402.

Additionally, it is desirable the flowchart of FIG. 7 is executed following the flowcharts in the above FIGS. 5 and 6, for example, if the first and second bridges 200 and 300 are initialized and if the main controller 100 accesses the SATA device. However, the flowchart of FIG. 7 is not limited thereto, and for example, the flowchart of FIG. 7 may be executed in parallel with the flowcharts in FIGS. 5 and 6 or after a certain period of time has elapsed after the flowcharts are executed.

The operation of the first bridge 200 First, in step S601, the command processing unit determines whether or not a command from the main controller 100 has been received. If the command has not been received from the main controller 100, the process of step S601 is repeated until the command is received. It is desirable that confirmation whether or not the command has been received is performed at a fixed period of time.

In contrast, if the command is received from the main controller 100, the process proceeds to step S602. In step S602, the command processing unit determines whether or not the command received in step S601 is an extended ATA command. If the received command is not the extended ATA command, in other words, if the received command is a standard ATA command, or if the received command is an extended ATA command but cannot be executed, the process proceeds to step S609. If the received command is the extended ATA command and it is executable, the process proceeds to step S603.

In step S603, the command processing unit determines whether or not the extended ATA command that has been received in step S601 can be executed by the first bridge 200 and is a command that accesses the inside of the first bridge 200. If the extended ATA command cannot be executed in the first bridge 200 or is not a command that accesses the inside of the first bridge 200, the process proceeds to step S604. If the extended ATA command can be executed in the first bridge 200 and is a command that accesses the inside of the first bridge 200, the process proceeds to step S606.

In step S604, the command processing unit determines whether or not the extended ATA command that has been received in step S601 is a command that accesses the first storage device 400. If the extended ATA command is not a command that accesses the first storage device 400, the process proceeds to step S605. If the extended ATA command is a command that accesses the first storage device 400, in other words, if the extended ATA command is a command that cannot be executed by the first storage device 400, the process proceeds to step S607.

In step S605, the command processing unit determines whether or not the extended ATA command that has been received in step S601 is a command that accesses the second bridge 300 connected to the SATA I/F 206. If the extended ATA command is not a command that accesses the second bridge 300, or if the extended ATA command cannot be executed in the second bridge 300, the process proceeds to step S607. If the extended ATA command is a command for accessing the second bridge 300 and the extended ATA command can be executed in the second bridge 300, the process proceeds to step S608.

In step S606, the command processing unit processes the extended ATA command that has been received in step S601 inside the first bridge 200. Specifically, the CPU 201 interprets the extended ATA command and performs operations such as reading/writing of data from/to the registers of the SATA I/Fs 204, 205, and 206 or authentication of the first bridge 200.

Step S607 is performed if the extended ATA command that has been received in step S601 cannot be processed by the first and second bridges 200 and 300 and it cannot also be processed by the first to third storage devices 400 and 401, and 402. Specifically, in step S607, upon receipt of an unexecutable extended ATA command, the command processing unit masks the extended ATA command (error processing). Accordingly, the CPU 201 provides a notification of an abort error to the main controller 100 without transmitting the extended ATA command to the second bridge 300 or the first storage device 400.

Note that whether or not the extended ATA command that has been received in S601 can be executed or cannot been executed is determined based on, for example, a list of executable commands stored in advance in the ROM 202 or the RAM 203. This will be described below.

In step S608, the command processing unit transmits the extended ATA command that has been received in step S601 to the second bridge 300 via the SATA I/F 206. Additionally, in step S609, the command processing unit transmits the standard ATA command that has been received in step S601 to the first storage device 400 or the second bridge 300 via the SATA I/F 205 or 206.

(The Operation of the Second Bridge 300)

Also in the second bridge 300, in a manner similar to that of the first bridge 200, the flowchart of FIG. 7 is executed by the command processing unit in the CPU 1001.

First, in step S601, the command processing unit determines whether or not the command has been received from the main controller 100 via the first bridge 200. If the command has not been received from the main controller 100, the process of step S601 is repeated until the command is received. In a manner similar to that of the first bridge 200, it is desirable that the confirmation of whether or not the command has been received is performed at a fixed period of time.

In contrast, if the command has been received from the main controller 100, the process proceeds to step S602. In step S602, the command processing unit determines whether or not the command that has been received in step S601 is an extended ATA command. If the received command is not an extended ATA command, or if the received command is an extended ATA command but cannot be executed, the process proceeds to step S609. If the received command is an extended ATA command and it is executable, the process proceeds to step S603.

In step S603, the command processing unit determines whether or not the extended ATA command that has been received in step S601 can be executed in the second bridge 300 and is a command that accesses the inside of the second bridge 300. If the extended ATA command cannot be executed in the second bridge 300 or is not a command that accesses the inside of the second bridge 300, the process proceeds to step S604. If the extended ATA command can be executed in the second bridge 300 and is a command that accesses the inside of the second bridge 300, the process proceeds to step S606.

In step S604, the command processing unit determines whether or not the extended ATA command that has been received in step S601 is a command that accesses the second or third storage devices 401 or 402. If the extended ATA command is not a command that accesses the second or third storage device 401 or 402, the process proceeds to step S605. If the extended ATA command is a command that accesses the second and third storage devices 401 or 402, in other words, if the extended ATA command is a command that cannot be executed by the second or third storage devices 401 or 402, the process proceeds to step S607.

In step S605, the command processing unit determines whether or not the extended ATA command that has been received in step S601 is a command that accesses another bridge connected to the SATA I/F (not illustrated) of the second bridge 300. If the extended ATA command is not a command that accesses another bridge, or if the extended ATA command cannot be executed by another bridge, the process proceeds to step S607. If the extended ATA command is a command that accesses the other bridge and it can be executed by another bridge, the process proceeds to step S608.

In step S606, the command processing unit processes the extended ATA command that has been received in step S601 in the second bridge 300. Specifically, the CPU 1001 interprets the extended ATA command and performs operations such as reading/writing of data to and from registers of the SATA I/Fs 1004, 1005, and 1006, or authentication of the second bridge 300.

Step S607 is performed if the extended ATA command that has been received in step S601 cannot be processed either by the second bridge 300 and another bridge or by the second and third storage devices 401 and 402. Specifically, in step S607, upon receipt of an unexecutable extended ATA command, the command processing unit masks the extended ATA command (error processing). Therefore, the CPU 1001 provides a notification of an abort error to the main controller 100 via the first bridge 200 without transmitting the extended ATA command to another bridge or the second and third storage devices 401 and 402.

Note that whether or not the extended ATA command received in step S601 is executable is determined based on, for example, a list of executable commands stored in advance in the ROM 1002 or the RAM 1003, in a manner similar to the first bridge 200. This will be described below.

In step S608, the command processing unit transmits the extended ATA command that has been received in step S601 to another bridge via the SATA I/F (not illustrated). Additionally, in step S609, the command processing unit transmits the standard ATA command that has been received in step S601 to the second or third storage device 401 or 402 via the SATAs I/F 1005 or 1006.

Figure 8:
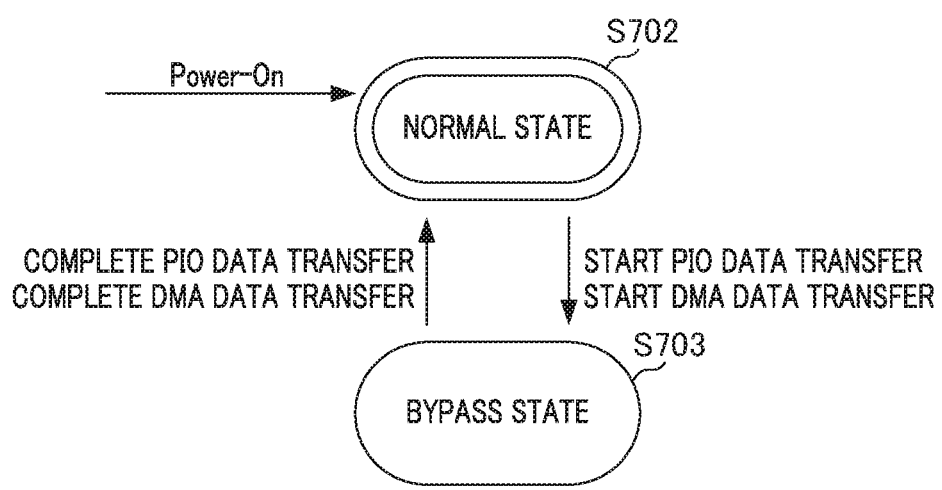
FIG. 8 is a state transition diagram during command processing.

FIG. 8 illustrates a state transition diagram during command processing.

The operation modes of the first and second bridges 200 and 300 are broadly divided into 'normal state_, 'bypass state_, and 'internal operation state_. In which operation mode the first and second bridges 200 and 300 are to be operated is determined by the execution of the programs stored in the ROM 202, 1002 or the RAM 203, 1003 by the CPUs 201 and 1001.

If power is supplied to the first and second bridges 200 and 300, the first and second bridges 200 and 300 are first set to the normal state S702. The normal state S702 is a state in which the first and second bridges 200 and 300 access the second bridge 300 or the first to third storage devices 400, 401, and 402.

With respect to the command from the SATA controller 110, the first and second bridges 200 and 300 determine whether or not the command can be executed by themselves and whether or not the command can be executed by the first to third storage devices 400, 401, and 402 connected to themselves. For example, as will be described below, the first and second bridges 200 and 300 determine that a command other than the commands specified in FIGS. 9 and 10 is an unexecutable command, so that the command cannot be transmitted to the first to third storage devices 400, 401, and 402.

Whether or not the command from the SATA controller 110 can be executed by the first and second bridges 200 and 300 or the first to third storage devices 400, 401, and 402 can be determined, for example, based on the reference data stored in the RAM 203 and 1003. Specifically, the first and second bridges 200 and 300 receive a command from the SATA controller 110 by the SATA I/Fs 204 and 1004 and it is recognized by the CPUs 201 and 1001. The CPUs 201 and 1001 perform the determination by comparing the command with the reference data in the RAMs 203 and 1003.

Upon determination that the command can be executed, the CPU 201 and 1001 set the SATA I/Fs 205 and 206, and transmit the command to the first to third storage devices 400, 401, and 402.

Upon receipt of a register access command (a command of 'PIO READ type), the first and second bridges 200 and 300 start PIO data transfer to transition from the normal state S702 to the bypass state S703. Subsequently, after the PIO data transmission to the main controller 100 is completed, the first and second bridges 200 and 300 transition from the bypass state S703 to the normal state S702.

Additionally, upon receipt of a DMA transfer type command indicating reading/writing of data, the first and second bridges 200 and 300 start DMA data transfer to transition from the normal state S702 to the bypass state S703. Subsequently, after the DMA data transfer to the main controller 100 is completed, the first and second bridges 200 and 300 transitions from the bypass state S703 to the normal state S702.

FIG. 9 illustrates an example of the extended command.

The extended command shown here is an example of an extended command that can be executed by the first and second bridges 200 and 300. Specifically, the extended command shown here is a command that can be executed only by the first and second bridges 200 and 300, unlike the ATA command used in normal HDD access. The list of these commands is stored in the RAMs 203 and 1003 or the ROMs 202 and 1002, as executable extended commands.

A command name 801 indicates a name of an executable command. A type 802 indicates a type of access. For example, 'Non Data type denotes an access that is not accompanying data transfer, for example, an access that is used for transition from the status confirmation/cutoff mode to the normal mode. The 'PIO data-out type and the 'PIO data-in type denote access accompanying reading/writing of data, and they are used, for example, for the acquisition of version information and authentication challenge to be described below.

An example of the extended command will be described below.

A 'SELECT PORT command 803 is a command that designates either the SATA I/F 205 or the SATA IF 206. Specifically, the 'SELECT PORT command 803 associates the command name to be a target with the SATA I/F.

As an example, a case in which the SATA I/F 205 is designated by the 'SELECT PORT command will be considered. In this case, if the extended command is issued from the main controller 100 to the first or second bridge 200 immediately after the designation, and the first bridge 200 issues a command corresponding to the command to the SATA I/F 205. In contrast, if the 'SELECT PORT command has not been issued, the command is issued to the SATA I/Fs 205 and 206, which are the host side of mirroring.

However, the method for specifying the SATA I/F 205 and 206 is not limited to the method using the command as described above. Specifically, as the method for specifying the SATAs I/F 205 and 206, another method, for example, a method using PM Port bit of FIS (Frame Information Structure) of SATA can be used.

A 'TO CASCADE command 804 is an extended command to the bridge of the subsequent stage. For example, upon receipt of the TO CASCADE command 804, the first bridge 200 does not execute the command that follows command 804 and transmits the next command to the second bridge 300. This means that a command included in the determination target commands and not next to the 'TO CASCADE command 804 is determined as 'Yes in step S603 and so executed inside the first bridge 200.

FIG. 10 illustrates an example of the standard command. Commands that can be transferred from the main controller 100 to the first to third storage devices 400, 401, and 402 are limited to, for example, the standard command shown in FIG. 10. The list of commands shown here is stored in the RAMs 203 and 1003, the ROMs 202 and 1002, the ROM 102 or the DRAM 103 as ATA commands.

A command name 901 indicates a name of an executable command. A Type 902 indicates a type of access. The 'Non-Data transfer type denotes an access not accompanying data transfer. The 'PIO data-in transfer type denotes an access accompanying reading of data. The 'DMA data-in_ and 'DMA data-out transfer types denote accesses accompanying reading/writing of data using DMA.

Note that in the 'PIO data-in transfer type, data transfer between the DRAM 103 in the main controller 100 and the first to third storage devices 400, 401, and 402 is performed under the management by the CPU 101 in the main controller 100. In contrast, the 'DMA data-in_ and 'DMA data-out data transfer types between the DRAM 103 in the main controller 100 and the first to third storage devices 400, 401, and 402 are performed without management by the CPU 101 in the main controller 100.

In this context, FIG. 9 and FIG. 10 will be described in association with the flowchart of FIG. 7 and the state transition diagram in FIG. 8. If a command is issued from the main controller 100, the command processing unit of the first or second bridge 200 or 300 temporarily holds the command inside the first and second bridges 200 and 300 by themselves (S601). Additionally, the command processing unit determines whether or not the command can be executed by the second bridge 300 or the first to third storage devices 400, 401, and 402 (S604, S605)

Subsequently, the command processing unit transmits a command that can be executed by the second bridge 300 (the command shown in FIG. 9) to the second bridge 300 (S608). Additionally, the command processing unit transmits a command that can be executed by the first to third storage devices 400, 401, and 402 (a command shown in FIG. 10) to the second bridge 300 or the first storage device 400 (S609).

In this content, a command determined to be unexecutable (a command other than the commands shown in FIGS. 9 and 10) is determined to be an error. Specifically, the command processing unit provides a notification of an abort error to the main controller 100 without transmitting the command to the second bridge 300 or the first storage device 400 (S607). Note that the main controller 100 is notified abort error is notified, for example, with setting the ERR bit of the Status register of the ATA task file register of the SATA I/F 204 to '1_ and the ABRT bit of the Error register to '1_.

Second Embodiment

In the first embodiment described above, the case in which the first and second bridges 200 and 300 have an SSD control function and a mirroring function has been described as an example. However, the embodiment of the present invention is not limited thereto, and of course another function may be added to the first and second bridges 200 and 300. Accordingly, in the second embodiment, the case in which the first and second bridges 200 and 300 have an encryption function and a decryption function will be described as an example.

Figure 11:
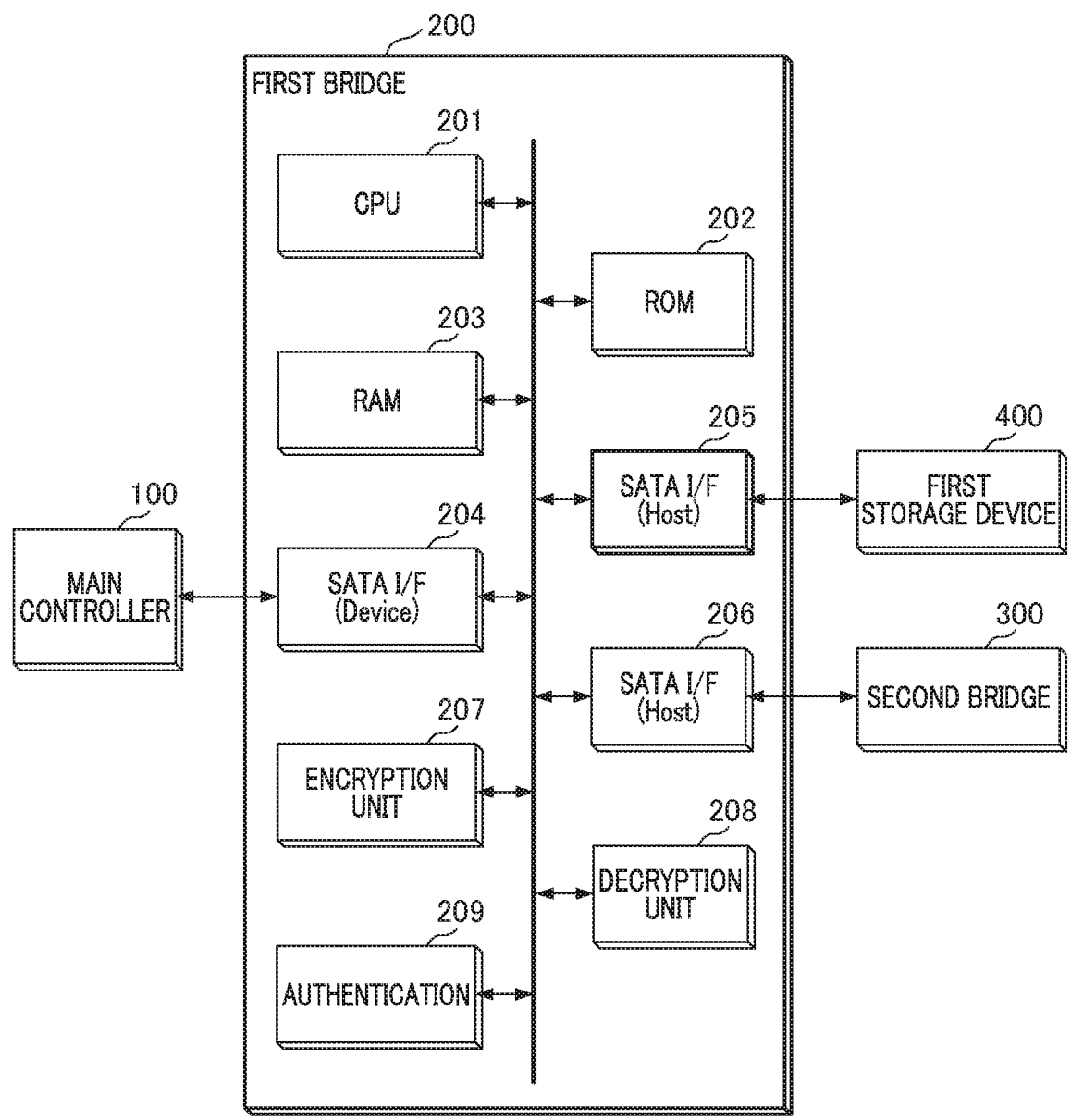
FIG. 11 is a detailed configuration diagram of the first bridge.

FIG. 11 illustrates a detailed configuration diagram of the first bridge.

The CPU 201 performs, for example, control of authentication, control of encryption and decryption of transferring/receiving data, system control of the first bridge 200, calculation processing, and ATA command processing, and also performs command processing to the first to third storage devices 400, 401, and 402.

The ROM 202 stores, for example, a startup program for the CPU 201, encryption/decryption programs, data of setting values of various modes including encryption and decryption, and encryption key information.

The RAM 203 stores a control program executed by the CPU 201. Additionally, the RAM 203 is also used as a temporary working area used for processes including a process related to encryption and decryption.

Note that since the SATA I/Fs 204, 205, and 206 are similar to those in the first embodiment, a detailed description thereof will be omitted.

An encryption unit 207 encrypts input data received by the SATA I/F 204 and thereby generates encrypted data (encryption data) after authentication by the authentication function 209 described below. The encryption data is transferred to the SATA I/Fs 205 and 206.

A decryption unit 208 decrypts the encrypted data received by the SATA I/Fs 205 and 206 and thereby generates decrypted data (decryption data) after authentication by the authentication function 209 described below. The decryption data is transferred to the SATA I/F 204.

An authentication function 209 is used in performing authentication between the main controller 100 and the first bridge 200.

Figure 12:
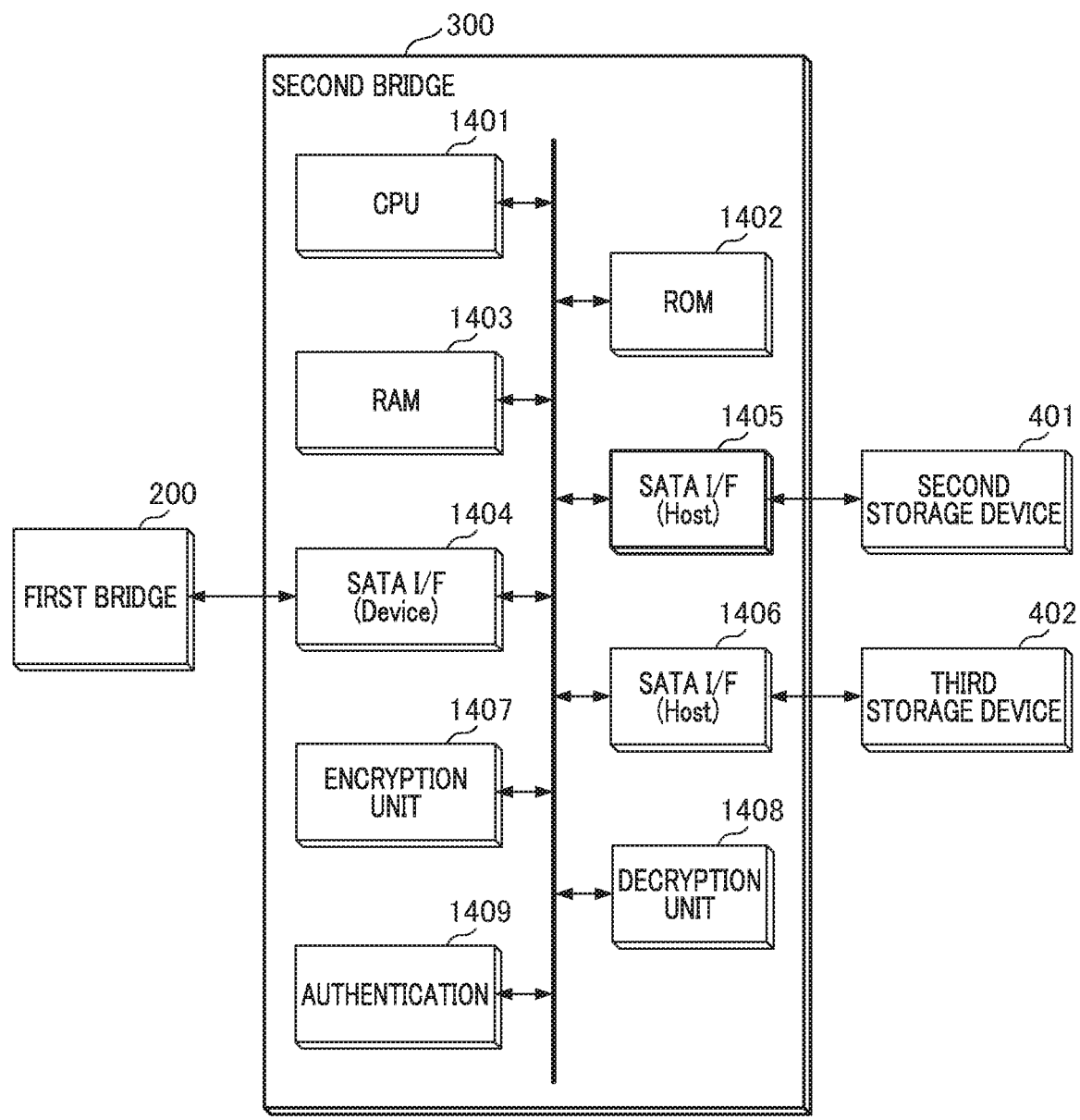
FIG. 12 is a detailed configuration diagram of the second bridge.

FIG. 12 illustrates a detailed configuration diagram of the second bridge.

Hereinafter, although the case in which the elements of the second bridge 300 are similar to those of the first bridge 200 will be described as an example, similar to the case of the first embodiment, the present invention is not limited thereto. The second bridge 300 may include elements that are not present in the first bridge 200, and conversely the first bridge 200 may include elements that are not present in the second bridge 300.

A CPU 1401 performs, for example, control of authentication, encryption and decryption of transmission/reception of data, system control of the second bridge 300, calculation processing, and ATA command processing, and performs, for example, command processing for the second and third storage devices 401 and 402.

A ROM 1402 stores, for example, a boot program of the CPU 1401, encryption/decryption programs, data for the setting values of various modes including encryption and decryption, and encryption key information.

A RAM 1403 stores a control program to be executed by the CPU 1401. Additionally, the RAM 1403 is also used as a temporary working area for processes including a process related to encryption and decryption.

Note that the SATA I/Fs 1404, 1405, and 1406 are the same as the first embodiment, so detailed description thereof will be omitted.

An encryption unit 1407 encrypts the input data received by the SATA I/F 1404 and thereby generates encrypted data (encrypted data) after authentication by the authentication function 1409 described below. The encrypted data is transferred to the SATA I/Fs 1405 and 1406.

A decoding unit 1408 decrypts the encryption data received by the SATA I/Fs 1405 and 1406 and thereby generates decrypted data (decryption data) after authentication by the authentication function 1409 described below. The decryption data is transferred to the SATA I/F 1404.

An authentication function 1409 is used in performing authentication between the main controller 100 and the second bridge 300.

Figure 13:
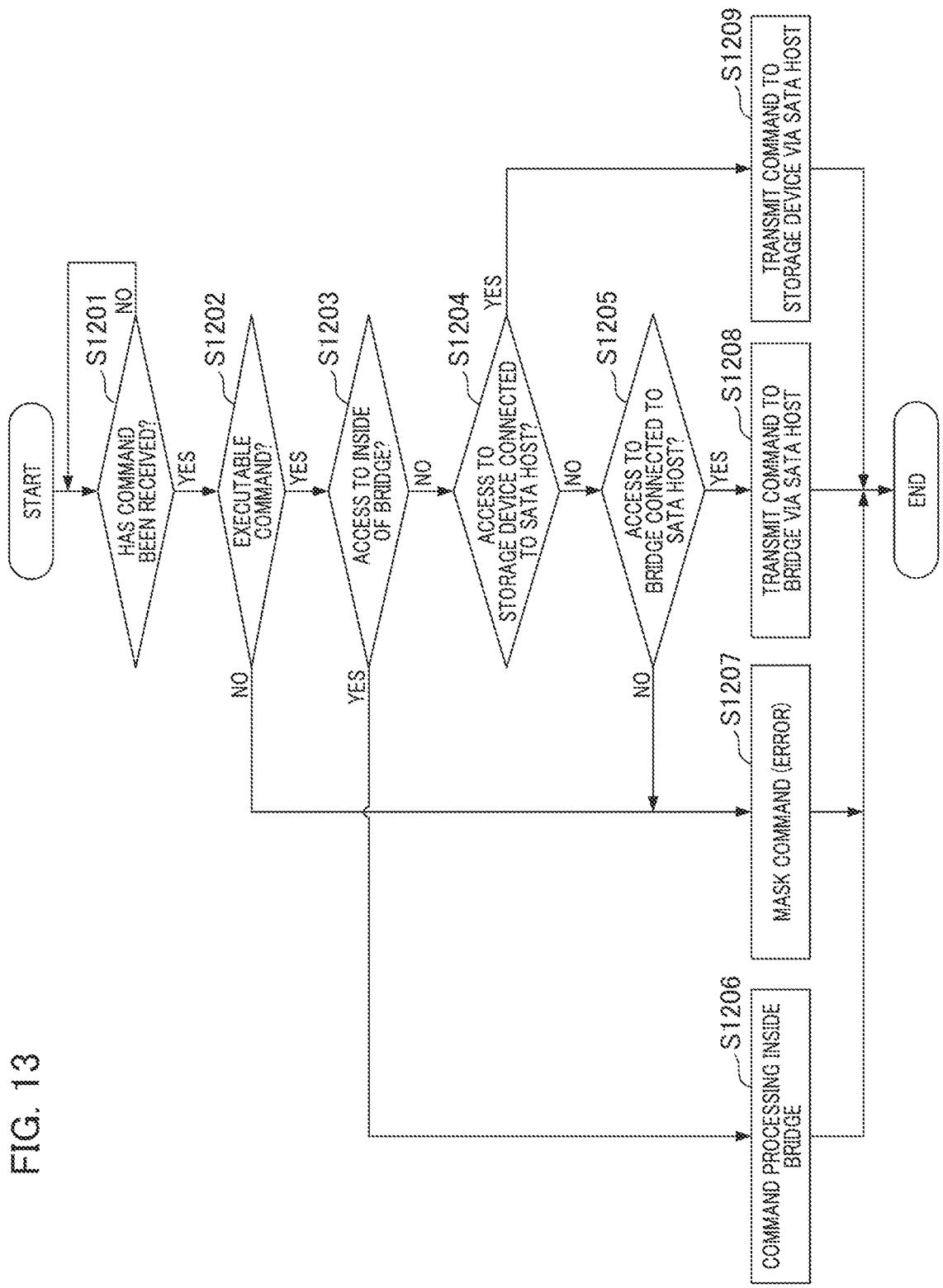
FIG. 13 is a flowchart illustrating the operation of the command processing unit.

FIG. 13 illustrates the operation of the command processing unit in the CPUs 201 and 1401.

The flowchart of FIG. 13 is realized by the execution of a program by the CPUs 201 and 1401. The program is stored in any one of the RAMs 203 and 1403, the ROMs 202 and 1402, and the first to third storage devices 400 to 402.

Additionally, the flowchart of FIG. 13 is desirably executed following the flowcharts of FIGS. 5 and 6, for example, in a case in which the first and second bridges 200 and 300 are initialized and/or the main controller 100 accesses the SATA device. However, the flowchart of FIG. 13 is not limited thereto, and for example, the flowchart may be executed in parallel with the flowcharts of FIGS. 5 and 6 or after a certain period of time has elapsed after the flowchart is executed.

(The Operation of the First Bridge 200)

First, in step S1201, the command processing unit determines whether or not a command from the main controller 100 has been received. If the command has not been received from the main controller 100, step S1201 is repeated until the command is received. It is desirable that confirmation of whether or not the command has been received is performed at a fixed period of time.

In contrast, if the command has been received from the main controller 100, the process proceeds to step S1202. In step S1202, the command processing unit determines whether or not the command that has been received in step S1201 is described in the command list of FIG. 14. Note that details of the command list of FIG. 14 will be described below. If the received command is not described in the command list of FIG. 14, in other words, if the received command is not an executable command, the process proceeds to step S1207. If the received command is described in the command list of FIG. 14, in other words, if it is an executable command, the process proceeds to step S1203.

In step S1203, the command processing unit determines whether or not the command that has been received in step S1201 is a command to access the inside of the first bridge 200. If the command is not a command that accesses the inside of the first bridge 200, the process proceeds to step S1204. If the command is a command that accesses the inside of the first bridge 200, the process proceeds to step S1206.

In step S1204, the command processing unit determines whether or not the command that has been received in step S1201 is a command for accessing the first storage device 400. If the command is not a command for accessing the first storage device 400, the process proceeds to step S1205. If the command is a command for accessing the first storage device 400, the process proceeds to step S1209.

In step S1205, the command processing unit determines whether or not the command that has been received in step S1201 is a command for accessing the second bridge 300 connected to the SATA I/F 206. If the command is not a command for accessing the second bridge 300, the process proceeds to step S1207. If the command is a command for accessing the second bridge 300, the process proceeds to step S1208.

In step S1206, the command processing unit processes the command that has been received in step S1201 inside the first bridge 200. Specifically, the CPU 201 interprets the command and performs operations such as the reading/writing of data to and from the registers of the SATA I/Fs 204, 205, and 206, or authentication of the first bridge 200.

Step S1207 is performed if the command that has been received in step S1201 cannot be processed either by the first and second bridges 200 and 300 or by the first to third storage devices 400, 401 and 402. Specifically, in step S1207, upon receipt of an unexecutable command, the command processing unit masks the command (error processing). Then, the CPU 201 provides a notification about an abort error to the main controller 100 without transmitting the command to the second bridge 300 or the first storage device 400.

In step S1208, the command processing unit transmits the command that has been received in step S1201 to the second bridge 300 via the SATA I/F 206. Incidentally, in step S1209, the command processing unit transmits the command that has been received in step S1201 to the first storage device 400 or the second bridge 300 via the SATA I/F 205 or 206.

(The Operation of the Second Bridge 300)

Also in the second bridge 300, in a manner similar to that of the first bridge 200, the flowchart of FIG. 13 is executed by the command processing unit in the CPU 1401.

First, in step S1201, the command processing unit determines whether or not a command has been received from the main controller 100 via the first bridge 200. If the command has not been received from the main controller 100, step S1201 is repeated until the command is received. In a manner similar to that of the first bridge 200, it is desirable that confirmation of whether or not the command has been received is performed at a fixed period of time.

In contrast, if the command has been received from the main controller 100, the process proceeds to step S1202. In step S1202, the command processing unit determines whether or not the command that has been received in step S1201 has been described in the command list in FIG. 14. If the received command has not been described in the command list in FIG. 14, in other words, if it is not an executable command, the process proceeds to step S1207. If the received command has been described in the command list in FIG. 14, in other words, if it is an executable command, the process proceeds to step S1203.

In step S1203, the command processing unit determines whether or not the command that has been received in step S1201 is a command for accessing the inside of the second bridge 300. If the command is not a command for accessing the inside of the second bridge 300, the process proceeds to step S1204. If the command is a command for accessing the inside of the second bridge 300, the process proceeds to step S1206.

In step S1204, the command processing unit determines whether or not the command that has been received in step S1201 is a command for accessing the second or third storage device 401 or 402. If the command is not a command for accessing the second or third storage device 401 or 402, the process proceeds to step S1205. If the command is a command for accessing the second and third storage devices 401 and 402, the process proceeds to step S1209.

In step S1205, the command processing unit determines whether or not the command that has been received in step S1201 is a command for accessing another bridge connected to the SATA I/F (not illustrated) of the second bridge 300. If the command is not a command for accessing the another bridge, the process proceeds to step S1207. If the command is a command for accessing the other bridge, the process proceeds to step S1208.

In step S1206, the command processing unit processes the command that has been received in step S1201 inside the second bridge 300. Specifically, the CPU 1401 interprets the command and performs operations such as reading/writing of data to and from the registers of the SATAs I/Fs 1404, 1405, and 1406, or authentication of the second bridge 300.

Step S1207 is performed if the command that has been received in step S1201 can be processed neither by the second bridge 300 and another bridge nor by the second and third storage devices 401 and 402. That is, in step S1207, if the command processing unit receives an unexecutable command, the command processing unit masks the command (error processing). Then, the CPU 1401 provides a notification of an abort error to the main controller 100 via the first bridge 200 without transmitting the command to another bridge, or the second and third storage devices 401 and 402.

In step S1208, the command processing unit transmits the command that has been received in step S1201 to another bridge via the SATA I/F (not illustrated). Incidentally, in step S1209, the command processing unit transmits the command that has been received in step S1201 to the second or third storage device 401 or 402 via the SATA I/F 1405 or 1406.

FIG. 14 illustrates an example of a command list.

The command list shown here is a list of commands that can be executed by the first and second bridges 200 and 300 or the first through third storage devices 400, 401, and 402. As already described, the command list in the drawing is stored in advance in, for example, the RAM 203 and the ROM 202. The determination as to whether or not the command from the main controller 100 can be executed is performed by comparing the command with the command list by using the command processing unit in the CPUs 201 and 1401.

Column 1301 is a list of operation states during receipt of commands.

Column 1302 indicates that the command destination (processing destination) is inside the bridge. For example, if the first bridge 200 includes the command list of FIG. 14, column 1302 means that the destination of the command (processing destination) is the first bridge 200. If the second bridge 300 uses FIG. 14, or if the command destination (processing destination) includes the command list of FIG. 14, column 1302 means that the command destination (processing destination) is the second bridge 300.

Column 1303 indicates that the command destination is the device connected to the SATA I/F (SATA host), in other words, the connection destination of the SATA host. For example, if the first bridge 200 includes the command list of FIG. 14, column 1303 means that the command destination (processing destination) is the connection destination of the SATA IFs 205 and 206. Additionally, if the second bridge 300 uses the command list of FIG. 14, column 1303 means that the command destination (processing destination) is the connection destination of the SATA IFs 1405 and 1406.

Note that column 1303 indicates, for example, a device recognized and memorized by the device determination unit in steps S404, S405, and S406 of FIG. 5, and a device recognized and memorized by the device determination unit in steps S504, S505, and S506 of FIG. 6.

The command processing unit determines executable commands for each SATA host (connection port) based on columns 1301, 1302, and 1303. In this context, although two lists of ATA commands (standard commands) and extended commands are shown in the drawing, the present invention is not limited thereto, and a list may be formed by using only one of them.

Comparative Example

Figure 15:
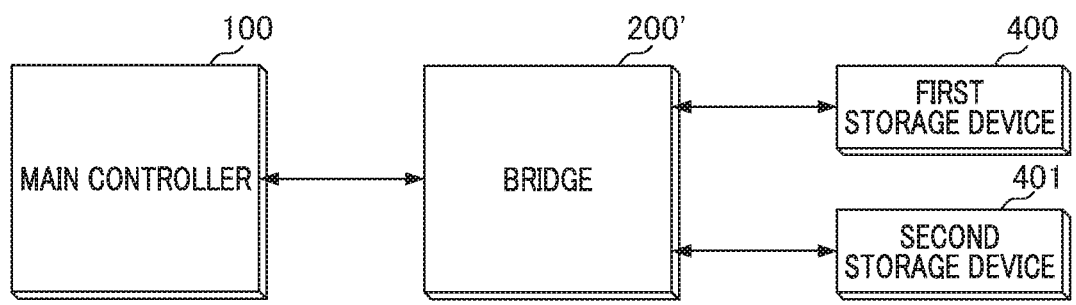
FIG. 15 is a configuration diagram of a storage system of a comparative example.

FIG. 15 illustrates a configuration diagram of the storage system of the comparative example. An SSD (solid state drive) device including a flash memory device can operate at a high speed twice or more than that of an HDD (hard disk drive) device, which is a typical nonvolatile storage device. However, the SSD device has the characteristic of having a low resistance to data rewriting frequency.

In this comparative example, in order to solve this disadvantage, an information processing apparatus, for example, a printing apparatus, has a hybrid configuration in which both the HDD device and the SSD device are mounted. If a data size required for page unit writing in the process of processing the print data is equal to or less than a predetermined threshold, the data is stored by using the HDD device. Additionally, if the data size exceeds the predetermined threshold, the data is stored by using the SSD device. Specifically, while a process that is sufficient at the processing speed of the HDD device utilizes the HDD device, a high-speed process that is insufficient at the processing speed of the HDD device utilizes the SSD device. Consequently, the data rewriting frequency, which is a disadvantage of the SSD device, is substantially reduced, and the service life of the entire storage system is prolonged.

FIG. 15 illustrates a configuration diagram of the storage system of the comparative example. This storage system includes the main controller 100 that controls the entire MFP, first and second storage devices 400 and 401 that store data, and a bridge 200' that executes data transmission/reception to and from these storage devices.

The first storage device 400 is, for example, the SSD device, and the second storage device 401 is, for example, the HDD device. The first storage device 400 stores data that requires a high access speed. The second storage device 401 stores, for example, a boot program, and user data, which do not require a high access speed. In such a configuration, mirroring cannot be substantially performed by using the first and second storage devices 400 and 401 having different access speeds, and as a result, a disadvantage in which the reliability of data cannot be ensured occurs.

In contrast, according to the storage system described in the first and second embodiments, as shown in FIG. 1, the second bridge 300 is cascade-connected to the first bridge 200. Subsequently, the data that requires a high access speed is stored in the first storage device 400 connected to the first bridge 200. Additionally, the data that does not require a high access speed is stored in the second and third storage devices 401 and 402 connected to the second bridge 300.

Specifically, since mirroring can be performed by using the second and third storage devices 401 and 402 connected to the second bridge 300, the reliability of data can be improved. Additionally, since the data that requires a high access speed can be stored in the first storage device 400, it is possible to achieve both of a mirroring function and a high access speed.

Note that, in the comparative example, since the bridge 200' does not issue an extended command to the SATA I/F, as shown in FIG. 1, it is not possible to cascade-connect a plurality of bridges. In the above-described first and second embodiments, various devices are proposed in which the first bridge 200 issues the extended command to the SATA I/F. Hence, in the first and second embodiments, the first and second bridges 200 and 300 are cascade-connected, so that both the mirroring function and the high access speed can be achieved.

Other Embodiments

The present embodiment is applicable to a storage control system including a command transfer unit that receives a command from a storage device or an external bridge device and transfers the command to a device different from the storage device or the external bridge device via its bridge device. In this case, the storage control system includes a command issuing unit that issues a command that inquires whether or not other bridge device that is different from the external bridge device is attached to its bridge device to serve as another device to be a transfer destination. Subsequently, if other bridge device is not attached to its bridge device to serve as another device to be a transfer destination, its bridge device performs a process that does not transfer the command that has been received from the upstream device (storage device or external bridge device) to another device. Even in such a storage control system, it is possible to obtain an effect the same as the above-described embodiment.

The present embodiment is also applicable to a case in which a program that realizes one or more of the above functions is supplied to a system/device via a network or a storage medium and one or more processors in the computer of the system/device executes the program. Additionally, the present embodiment can realize one or more of the above functions by a predetermined circuit (for example, an ASIC).

Conclusion

As described above, according to the present embodiment, it is possible to connect a device other than the storage device to the bridge and change the command that can be transmitted to the device in accordance with the type of the device of the subsequent stage, whereby both the mirroring function and the high access speed can be compatible with each other.

The present invention is not limited to the above-described embodiments, and various modifications and changes are possible within the scope of the gist thereof.

Aspects of the present embodiment can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-096344 filed May 18, 2018, which is hereby incorporated by reference herein in its entirety.

What is claimed is:

1. A storage system connected with a plurality of storage devices, which comprises;
    a first bridge configured to communicate with a main controller;
    a second bridge configured to enable communication with the first bridge;
    a first storage device configured to enable communication with the first bridge; and
    a second storage device and a third storage device configured to enable communication with the second bridge,
    wherein the first bridge has a controller,
    the controller transmits a command corresponding to a received command to the second bridge, based on the received command that has been received from the main controller being a command not corresponding to the first storage device and being a command to transmit to the second bridge,
    the controller transmits the command corresponding to the received command to the second bridge or the first storage device, based on the received command that has been received from the main controller being a command corresponding to the first storage device, and
    the controller executes a process based on the received command, which has been received from the main controller, is a command not corresponding to the first storage device, and is a command to transmit to the first bridge.

2. The storage system according to claim 1, wherein the controller masks the received command based on the received command that has been received from the main controller being a command not corresponding to the first storage and being a command to transmit to the first storage device.

3. The storage system according to claim 1, wherein the controller generates encryption data based on input data from the main controller and generates decryption data based on the encryption data from the second bridge or the first storage device.

4. The storage system according to claim 3, wherein, if the command not corresponding to the first storage device is a command related to encryption or decryption, the controller executes a process based on the received command.

5. The storage system according to claim 3, wherein, if the command not corresponding to the first storage device is a command related to setting or inquiry to the second bridge, the controller transmits the command corresponding to the received command to the second bridge without performing encryption.

6. The storage system according to claim 5, wherein if the controller transmits the command corresponding to the received command to the second bridge without performing encryption, the controller transmits a response to the command corresponding to the received command to the main controller without performing decryption.

7. The storage system according to claim 3, wherein if the received command is a command related to reading/writing to the second storage device or the third storage device, and the encryption is authenticated, the controller transmits the command related to reading/writing to the second bridge.

8. The storage system according to claim 1, wherein if the command corresponding to the first storage device is a standard command that accesses the first storage device, the controller transmits the command corresponding to the received command to the first storages device.

9. The storage system according to claim 1,
wherein the second bridge has a mirror controller that performs mirroring to the second storage device and the third storage device.

10. The storage system according to claim 9,
wherein if the command not corresponding to the first storage device is a command related to the mirroring, the controller transmits the command corresponding to the received command to the second bridge.

11. The storage system according to claim 1,
wherein the main controller, the first bridge, and the second bridge are connected in series.

12. The storage system according to claim 1,
wherein the first storage device is an SSD, and the second storage device and the third storage device are HDDs.

13. The storage system according to claim 1, wherein
the first bridge includes a plurality of connection ports, and
the controller manages the state of each connection port at four stages: (1) before search for the device, (2) the presence of the connection of the second bridge, (3) the presence of the connection of the first storage device, and (4) the absence of the connection of the device.

14. The storage system according to claim 13,
wherein if a state of a predetermined connection port among the connection ports is (1) before a search for the device, the controller determines that the state of the predetermined connection port is any one of (2) the presence of the connection of the second bridge, (3) the presence of the connection of the first storage device, and (4) the absence of the connection of the device".

15. The storage system according to claim 14,
wherein the state of the connection ports is either (2) the presence of the connection of the first storage device or (3) the absence of the connection of the device, and the input command is a command for accessing the second bridge, the controller masks the received command.

16. A control method to control a storage system connected with a plural storage devices, which comprises:
a first bridge configured to communicate with a main controller;
a second bridge configured to enable communication with the first bridge;
a first storage device configured to enable communication with the first bridge; and
a second storage device and a third storage device configured to enable communication with the second bridge,
wherein the first bridge has a controller,
the method comprising:
transmitting a command corresponding to the received command from the controller to the second bridge, based on the command that has been received from the main controller being a command not corresponding to the first storage device and being a command to transmit to the second bridge;
transmitting the command corresponding to the received command from the controller to the second bridge or the first storage device, based on the command that has been received from the main controller being a command corresponding to the first storage device; and
executing a process based on the received command that has been received from the main controller being a command not corresponding to the first storage device and being a command to transmit to the first bridge.

* * * * *